(12) United States Patent
Abraham

(10) Patent No.: US 6,891,880 B2
(45) Date of Patent: May 10, 2005

(54) METHOD AND APPARATUS FOR PERFORMING SIGNAL CORRELATION

(75) Inventor: Charles Abraham, San Jose, CA (US)

(73) Assignee: Global Locate, Inc., San Jose, CA (US)

( * ) Notice: Subject to any disclaimer, the term of this patent is extended or adjusted under 35 U.S.C. 154(b) by 280 days.

(21) Appl. No.: 10/081,925

(22) Filed: Feb. 22, 2002

(65) Prior Publication Data

US 2002/0175857 A1 Nov. 28, 2002

Related U.S. Application Data

(63) Continuation-in-part of application No. 09/861,086, filed on May 18, 2001, now Pat. No. 6,606,346.

(51) Int. Cl.[7] ............................................. H04L 27/30
(52) U.S. Cl. ...................... 375/142; 375/150; 375/343; 375/367; 370/335; 370/342; 370/441; 370/515
(58) Field of Search ................................. 375/142, 150, 375/343, 364, 367; 370/335, 342, 441, 475, 515

(56) References Cited

U.S. PATENT DOCUMENTS

| | | | |
|---|---|---|---|
| 4,426,712 A | 1/1984 | Gorski-Popiel | 375/96 |
| 4,445,118 A | 4/1984 | Taylor et al. | 343/357 |
| 4,527,278 A | 7/1985 | Deconche et al. | 375/97 |
| 4,578,678 A | 3/1986 | Hurd | 343/357 |
| 4,660,164 A | 4/1987 | Leibowitz | 364/728 |
| 5,090,028 A | 2/1992 | Crebouw | 375/106 |
| 5,117,232 A | 5/1992 | Cantwell | 342/357 |

(Continued)

FOREIGN PATENT DOCUMENTS

| | | | | |
|---|---|---|---|---|
| DE | 4114058 | 11/1992 | | H04L/27/00 |
| EP | 0 488 739 | 6/1992 | | G01S/5/14 |
| EP | 0 526 040 | 2/1993 | | G01S/5/14 |
| EP | 0 635 728 | 1/1995 | | G01S/5/14 |
| EP | 0 718 998 | 6/1996 | | H04J/13/02 |
| GB | 2016760 | 9/1979 | | G06F/15/34 |
| WO | 97/14057 | 4/1997 | | G01S/1/04 |
| WO | 97/40398 | 10/1997 | | G01S/5/14 |
| WO | 98/02830 | 1/1998 | | G06F/17/15 |

OTHER PUBLICATIONS

R. Wolfert, S. Chen, S. Kohli, D. Leimer, "Rapid Direct P(Y)–Code Acquisition In a Hostile Environment"Software Technology and Systems, Sensors Directorate, Air Force Research Lab. pp 353–360.

S. Lyusin, I. Khazanov, S. Likhovid, "Fast Acquisition by Matched Filter Technique for GPS/GLONASS Receivers", Magellan Corp. Moscow Dev. Center. pp 307–315.

Wolfert, et al., "Rapid Direct P(Y)–Code Acquisition in a Hostile Environment," CONFERENCE: Institute of Navigation: Satellite Division–International technical meeting; 11th Proceedings of Ion GPS, 1998; vol. 11; No. 1 P: 353–360 Alexandria, VA, Institute of Navigation.

Lyusin, et al., "Fast Acquisition by Matched Filter Technique for GPS/GLONASS Receivers", CONFERENCE: Institute of Navigation: Satellite Division–International technical meeting; 11th Proceedings of Ion GPS, 1998; vol. 11; No. 1P: 307–316 Alexandria, VA, Institute of Navigation.

Copy of International Search Report dated May 12, 2003 from corresponding PCT Application, PCT/US03/03386.

*Primary Examiner*—Dac V. Ha
(74) *Attorney, Agent, or Firm*—Moser, Patterson & Sheridan LLP

(57) ABSTRACT

A method and apparatus for computing a convolution between an input GPS signal and a C/A code reference by generating the convolution result in real time without storing unprocessed signal samples. The apparatus comprises a vector multiplier running at high speed to achieve the same result as a vector multiplier sized to process an entire epoch. Additionally, the input samples to, and the output samples of, the vector multiplier can be quantized to reduced circuit complexity.

17 Claims, 14 Drawing Sheets

U.S. PATENT DOCUMENTS

| | | | |
|---|---|---|---|
| 5,148,452 A | 9/1992 | Kennedy et al. | 375/96 |
| 5,153,598 A | 10/1992 | Alves, Jr. | 342/352 |
| 5,175,557 A | 12/1992 | King et al. | 342/357.12 |
| 5,185,610 A | 2/1993 | Ward et al. | 342/357 |
| 5,199,050 A | 3/1993 | Linsky | 375/115 |
| 5,216,691 A | 6/1993 | Kaufmann | 375/1 |
| 5,237,587 A | 8/1993 | Schoolcraft | 375/1 |
| 5,293,398 A | 3/1994 | Hamao et al. | 375/1 |
| 5,369,668 A | 11/1994 | Yamamoto | 375/14 |
| 5,379,224 A | 1/1995 | Brown et al. | 364/449 |
| 5,426,665 A | 6/1995 | Cleverly et al. | 375/200 |
| 5,579,014 A | 11/1996 | Brooksby et al. | 342/357 |
| 5,579,338 A | 11/1996 | Kojima | 375/208 |
| 5,600,328 A | 2/1997 | Tachita et al. | 342/357 |
| 5,629,708 A | 5/1997 | Rodal et al. | 342/357 |
| 5,644,591 A | 7/1997 | Sutton | 375/200 |
| 5,663,734 A | 9/1997 | Krasner | 342/357 |
| 5,726,659 A | 3/1998 | Kee et al. | 342/352 |
| 5,727,018 A | 3/1998 | Wolf et al. | 375/210 |
| 5,729,571 A | 3/1998 | Park et al. | 375/206 |
| 5,781,543 A | 7/1998 | Ault et al. | 370/342 |
| 5,809,064 A | 9/1998 | Fenton et al. | 375/208 |
| 5,812,087 A | 9/1998 | Krasner | 342/357 |
| 5,859,612 A | 1/1999 | Gilhousen | 342/457 |
| 5,867,219 A | 2/1999 | Kohiyama | 348/400 |
| 5,872,774 A | 2/1999 | Wheatley, III et al. | 370/335 |
| 5,884,214 A | 3/1999 | Krasner | 701/207 |
| 5,901,171 A | 5/1999 | Kohli et al. | 375/200 |
| 5,907,578 A | 5/1999 | Pon et al. | 375/208 |
| 5,909,471 A | 6/1999 | Yun | 375/343 |
| 5,920,278 A | 7/1999 | Tyler et al. | 342/33 |
| 5,952,947 A * | 9/1999 | Nussbaum et al. | 341/143 |
| 5,999,562 A | 12/1999 | Hennedy et al. | 375/207 |
| 6,002,708 A | 12/1999 | Fleming et al. | 375/200 |
| 6,034,635 A | 3/2000 | Gilhousen | 342/457 |
| 6,047,017 A | 4/2000 | Cahn et al. | 375/200 |
| 6,104,340 A | 8/2000 | Krasner | 342/357.1 |
| 6,111,868 A | 8/2000 | Lee et al. | 370/342 |
| 6,121,923 A | 9/2000 | King | 342/357.12 |
| 6,133,874 A | 10/2000 | Krasner | 342/357.15 |
| 6,151,311 A | 11/2000 | Wheatley, III et al. | 370/335 |
| 6,151,353 A * | 11/2000 | Harrison et al. | 375/136 |
| 6,157,891 A | 12/2000 | Lin | 701/301 |
| 6,181,911 B1 | 1/2001 | Sih et al. | 455/12.1 |
| 6,208,291 B1 | 3/2001 | Krasner | 342/357.12 |
| 6,208,292 B1 | 3/2001 | Sih et al. | 342/357.12 |
| 6,211,820 B1 | 4/2001 | Zou et al. | 342/357.1 |
| 6,236,354 B1 | 5/2001 | Krasner | 342/357.06 |
| 6,239,742 B1 | 5/2001 | Krasner | 342/357.02 |
| 6,252,543 B1 | 6/2001 | Camp | 342/357.06 |
| 6,256,337 B1 | 7/2001 | Hendrickson et al. | 375/140 |
| 6,272,189 B1 | 8/2001 | Garin et al. | 375/343 |
| 6,289,041 B1 | 9/2001 | Krasner | 375/152 |
| 6,307,840 B1 | 10/2001 | Wheatley, III et al. | 370/252 |
| 6,324,227 B1 | 11/2001 | Kang et al. | 375/343 |
| 6,327,473 B1 | 12/2001 | Soliman et al. | 455/456 |
| 6,370,208 B1 | 4/2002 | Kuo et al. | 375/343 |
| 6,441,780 B1 * | 8/2002 | Rog et al. | 342/357.12 |
| 2002/0033767 A1 | 3/2002 | Krasner | 342/357.06 |

* cited by examiner

METHOD AND APPARATUS FOR PERFORMING SIGNAL CORRELATION

CROSS-REFERENCE TO RELATED APPLICATIONS

This application is a continuation-in-part of U.S. patent application Ser. No. 09/861,086, filed May 18, 2001, now U.S. Pat. No. 6,606,346, which is herein incorporated by reference.

BACKGROUND OF THE INVENTION

1. Field of the Invention

The present invention relates to signal correlators for digital signal receivers and, more particularly, the invention relates to a method and apparatus for performing signal correlation in, for example, a global positioning system (GPS) receiver.

2. Description of the Related Art

The process of measuring a global positioning system (GPS) signal begins with a procedure to search for the GPS signal in the presence of noise by attempting a series of correlations of the incoming signal against a known pseudo-random noise (PRN) code. The search process can be lengthy, as both the exact frequency of the signal and the time-of-arrival delay are unknown. To find the signal, receivers traditionally conduct a two dimensional search, checking each delay possibility at every possible frequency. To test for the presence of a signal at a particular frequency and delay, the receiver is tuned to the frequency, and the incoming signal is correlated with the known PRN code delayed by an amount corresponding to the time of arrival. If no signal is detected, the search continues to the next delay possibility, and after all delay possibilities are checked, continues to the next frequency possibility. Each individual correlation is performed over one or more milliseconds in order to allow sufficient signal averaging to distinguish the signal from the noise. Because many thousand frequency and delay possibilities are checked, the overall acquisition process can take tens of seconds.

Recently, new applications of GPS technology in wireless devices have emerged, for example, the use of GPS in cellular phones to provide emergency location capability. In these applications, rapid signal acquisition in just a few seconds is required. Furthermore, these applications require a GPS receiver to operate in harsh signal environments and indoors, where GPS signal levels are greatly attenuated. Detecting attenuated signals requires each correlation to be performed over a relatively long period of time. For example integration may be performed over a few seconds, as opposed to the 1–10 millisecond period used in traditional GPS receivers. The two-dimensional sequential search process employed by traditional receivers becomes impractical at such long integration times, because the overall search time increases by a factor of 100 or more.

To accelerate the search process, GPS designers add additional correlators to the receiver so that multiple time-of-arrival possibilities can be checked simultaneously. Typically, each correlator that is added requires a separate code mixer and signal accumulator. For a given sensitivity level, this decreases search times in proportion to the number of correlators. To achieve the sensitivity and acquisition time demanded in cellular phone applications, the design might have to incorporate thousands of correlators. This addition is typically prohibitively complex and expensive for a consumer class device.

For example, U.S. Pat. No. 5,901,171, issued May 4, 1999, describes a triple multiplexing technique that allows a single time-shared processing block to be used to perform up to 20 simultaneous correlations on each of 12 channels. This offers an improvement in performance relative to single correlator designs since blocks of 20 delay possibilities are checked simultaneously. A full signal search over a full range of delay uncertainties requires using the block of 20 correlators approximately 100 times in succession to check 2046 delays. Thus, if an acquisition must be performed in a few seconds, the integration time is limited to tens of milliseconds. This is insufficient to achieve the sensitivity needed for indoor GPS applications.

To further improve the search process, other GPS receiver architectures include processing capable of generating a convolution between the incoming signal and the known PRN code. This is equivalent to providing a complete set of correlators spanning all time delay possibilities over a full C/A code epoch (1023 chips), and U.S. Pat. No. 5,663,734, issued Sep. 2, 1997, describe fast Fourier transform (FFT) based software techniques to efficiently generate the necessary correlation results using software algorithms. This approach is not suitable for all applications, because a programmable digital signal processor (DSP) is needed to run the software FFT, and a large memory is needed to store unprocessed signal samples. Furthermore, this approach can have a large processing delay due to the software computations and the fact that software processing starts only after a complete snapshot of the signal is stored. In many applications, a real time processing solution is preferred, preferably one that does not involve extensive software processing. Lyusin et al., "Fast Acquisition by Matched Filter Technique for GPS/GLONASS Receivers", pp 307–315 describes hardware approaches to performing the convolution in real time using a matched filter with 1023 taps. The matched filter consists of shift registers large enough to hold a full C/A code epoch, as well as a width 1023 vector multiplier and adder unit that generates the inner product between a full epoch of the signal and the C/A code.

This circuit is complex relative to the constraints of low cost consumer devices such as cellular phones. Other matched filter approaches, such as utilized in military class receivers for P-code acquisition, also incorporate large vector multipliers.

Thus, there is a need for an improved, simple and low cost GPS processing block capable of processing an entire epoch of signal and C/A code. Such a device must be built from hardware of relative simplicity, yet be capable of generating a full convolution, or many parallel correlations, preferably without a large vector multiplier.

SUMMARY OF THE INVENTION

The invention provides a method and apparatus for computing a full convolution between an input signal (e.g., a GPS signal) and a pseudorandom noise (PRN) code reference by generating the convolution result in real time without storing unprocessed signal samples, and without extensive software processing. The apparatus comprises a vector multiplier running at high speed to achieve the same result as a vector multiplier sized to process an entire epoch. The invention can be implemented in an integrated circuit that fits the complexity constraints of a consumer class device such as a cellular phone. The design includes the necessary logic to enable long term averaging of convolution results to ensure high sensitivity. This invention is capable of correlating signals for use in deriving a position location from highly attenuated signals, including signals received indoors.

The complete apparatus consists of a conventional GPS tuner, a decimation circuit, a convolution processor, and RAM blocks that accumulate convolution results. The convolution processor runs at a high clock rate on the order of 100 MHz and higher enabling the computation of a full convolution by repeated use of a small block of circuitry. Specifically, each point of the convolution is decomposed into a series of partial correlations, each of which is generated using a vector multiplier that is sized to process only a portion of an epoch. The apparatus organizes the partial correlations by subdividing the C/A code into a non-overlapping set of code segments. Each partial correlation uses only one code segment at a time, allowing the C/A code to be stored and retrieved efficiently, using a simple lookup table.

The processor begins by decimating input IF samples to create a signal stream at a desired sample rate, where the rate is precisely matched to the timing of the incoming signal. If the desired sample rate is $Pf_o$ (P samples per C/A chip) then the sampling rate is set so that exactly 1023×P samples are taken in each signal epoch. The processor correlates the signal clocking signals through shift registers sized to hold P×K input samples, where K is a factor of 1023. At each signal shift, a series of M partial correlation operations are performed with M chosen such that M×K=1023. Each partial correlation consists of taking the inner product of the contents of the signal shift registers with a block of reference samples created by extending a length K segment of the C/A code to P×K samples. Partial correlation results are accumulated in memory. By accumulating partial correlation results, the processor generates complete correlation results for many correlation points, up to the full convolution.

In another embodiment of the invention, the input samples to the convolution processor are quantized to reduce circuit complexity of the vector multiplier. Likewise, the output samples of the convolution processor are quantized to reduce circuit complexity of the accumulation circuitry.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
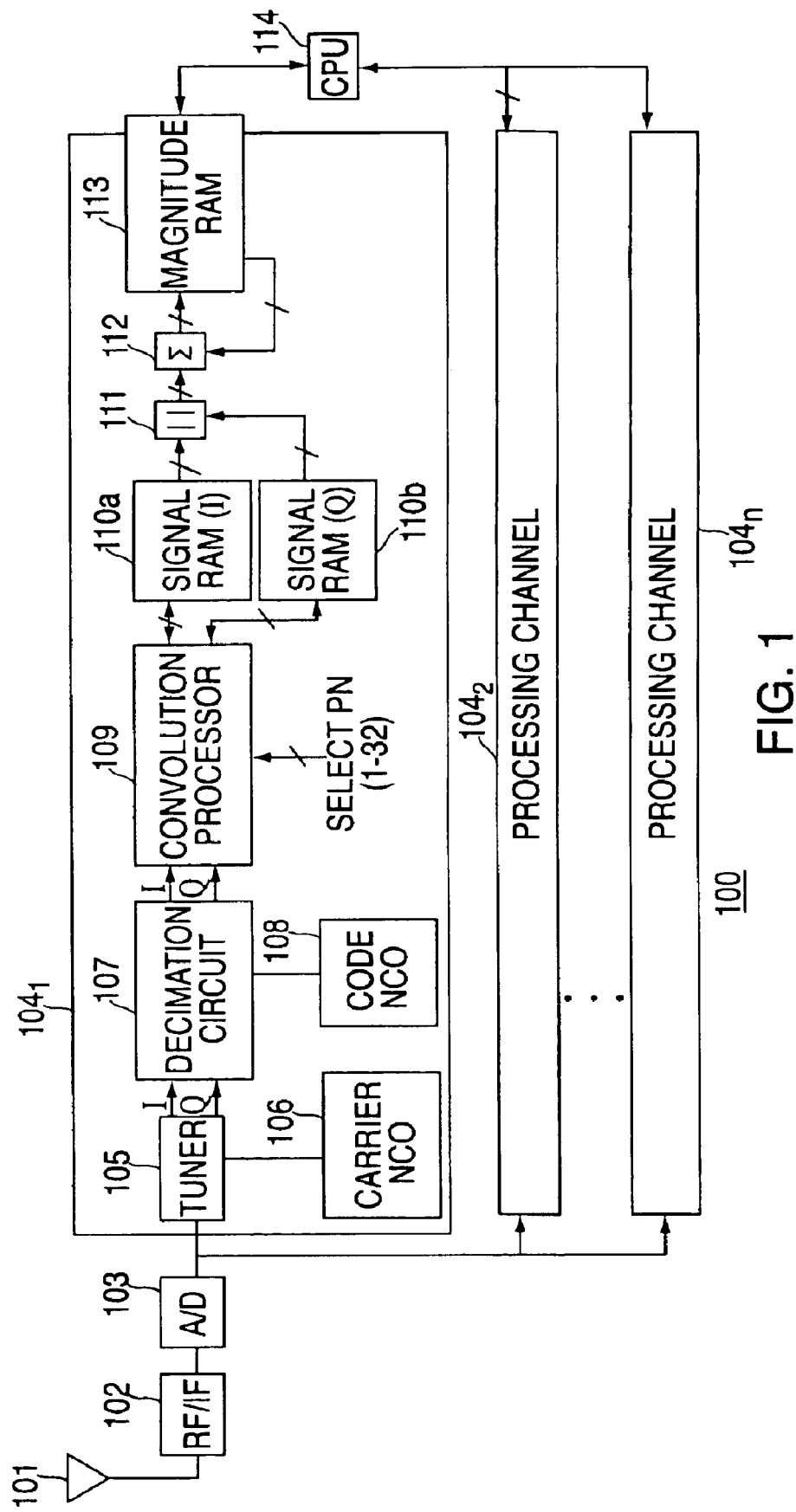
FIG. 1 shows a block diagram of a GPS receiver comprising the present invention.

FIG. 1 depicts a block diagram of a global positioning system (GPS) receiver 100 incorporating the present invention. The use of a GPS receiver as the platform within which the invention is incorporated forms one application of the invention. Other platforms that require signal correlation may find use for the present invention.

Signals (such as GPS signals) are received by an antenna 101. A radio-frequency-to-intermediate-frequency converter (RF/IF converter) 102 filters, amplifies, and frequency shifts the signal for digitization by an analog-to-digital converter (A/D) 103. The elements 101, 102 and 103 are substantially similar to those elements used in a conventional GPS receiver.

The output of the A/D 103 is coupled to a set of processing channels $104_1$, $104_2$, . . . , $104_n$ (where n is an integer) implemented in digital logic. Each processing channel $104_n$ may be used to process the signal from a particular GPS satellite. The signal in a particular channel is tuned digitally by a tuner 105, driven by a numerically controlled oscillator (NCO) 106. The tuner 105 serves two purposes. First, the IF frequency component remaining after RF/IF conversion is removed. Second, the satellite Doppler frequency shift resulting from satellite motion, user motion, and reference frequency errors is removed. The output from the tuner is a baseband signal consisting of an in-phase component (I) and a quadrature component (Q). The steps of 105 and 106 are substantially similar to those used in conventional GPS receiver designs.

A decimation circuit 107 processes the output of the 105. The output of the decimation circuit 107 is a series of complex signal samples with I and Q components, output at a rate precisely timed to match the timing of the input signal. In one embodiment of the invention, the decimation operation is a simple pre-summer that sums all the incoming signal samples over the period of an output sample. A numerically controlled oscillator (NCO) 108 is used to time the sampling process. For example, if P=2, the code NCO 108 is set to generate a frequency of $(2 \times f_s)$, where $f_s$ is $f_0$ (the GPS signal's C/A code chipping rate), adjusted for Doppler shift. The NCO adjusts for Doppler shift based on external input from firmware commands. Because the Doppler shift is different for each satellite, a separate code NCO 108 and decimation circuit 107 is required for each channel 104$_n$. It should be noted that there is no requirement that the incoming sample rate be an integer multiple of the fs, as the code NCO 108 is capable of generating an arbitrary frequency. If the decimation circuit 107 is a pre-summer, the number of samples summed will typically toggle between two values, so that over the long term, the correct sample timing is maintained. For example, if the incoming sample rate is 10 MHz, and the desired sample rate is 2.046 MHz, the pre-summer will add either 4 or 5 samples, so that the desired sample rate is maintained on average.

The decimation circuit 107 may also include a quantizer (not shown) at its output to reduce the number of bits in the signal components before further processing. In one embodiment of the invention, 2-bit quantization is used.

The signal samples from decimation circuit 107 are coupled to a convolution processor 109. The convolution processor 109 generates results that are stored in signal random access memories (RAMs) 110a and 110b. Specifically, these RAMs 110a and 110b hold a complex vector that makes up all or part of the full convolution between the input signal and a reference PN code (e.g. a GPS C/A code). The convolution result will have a peak at points corresponding to high correlation between the signal and reference (the PN code). As shall be discussed in detail below, the relative location of these peaks for various satellite signals is used to ultimately compute position information.

The convolution processor 109 and signal RAMs 110a and 110b accumulate convolution results for multiple epochs of the GPS signal, which repeats at nominal 1 millisecond intervals. For example, if 10 milliseconds of the signal are processed, the values in RAM 110a and 110b are the sum of 10 correlation results each generated over one epoch. All the individual correlations should have a similar taken at the same relative moment within each epoch. Accumulating similar results from individual correlations improves the signal to noise ratio, enhancing the ability of the receiver to detect weak signals. This processing may be referred to as coherent integration and, as will be discussed, can be combined with magnitude integration to yield correlation results averaged over a time period of up to several seconds.

The length of time over which coherent integration interval is performed is limited by several factors, including uncompensated Doppler shift, GPS signal navigation data bits, and phase shifts induced by motion of the receiver 100. These factors introduce slow, but seemingly random phase variations into the signals. Over many tens of milliseconds, these phase changes cause destructive interference that defeats the purpose of coherent integration. Therefore, to achieve long averaging intervals, the receiver 100 performs a secondary step of magnitude accumulation. Specifically, the signals stored in the signal RAMs 110a and 110b are periodically output to a complex normalizer 111 that generates a complex magnitude value of the complex convolution vector. The complex magnitude values are accumulated by an adder 112 and stored in magnitude RAM 113. Each time the complex magnitude of the signal is computed, the signal RAMs 110a and 110b are cleared to allow another coherent integration to occur. The process continues until the desired number of magnitude accumulations is completed. For example, if the coherent averaging interval is 10 milliseconds, and 200 magnitude accumulations are desired, the total process will run over 2 seconds.

After convolution processing, the magnitude RAM 113 contains a vector containing the complex magnitude of the convolution result, integrated to improve signal-to-noise ratio. As shall be discussed below, this vector is further processed by software algorithms that are executed by the CPU 114 to produce pseudorange data that is used to yield the position of the receiver. It should be noted that the CPU computational load for these steps is quite modest compared to a conventional GPS receiver or an FFT based correlator. In this implementation, the computationally intensive tasks of correlation and integration are completed prior to software processing.

Figure 2:
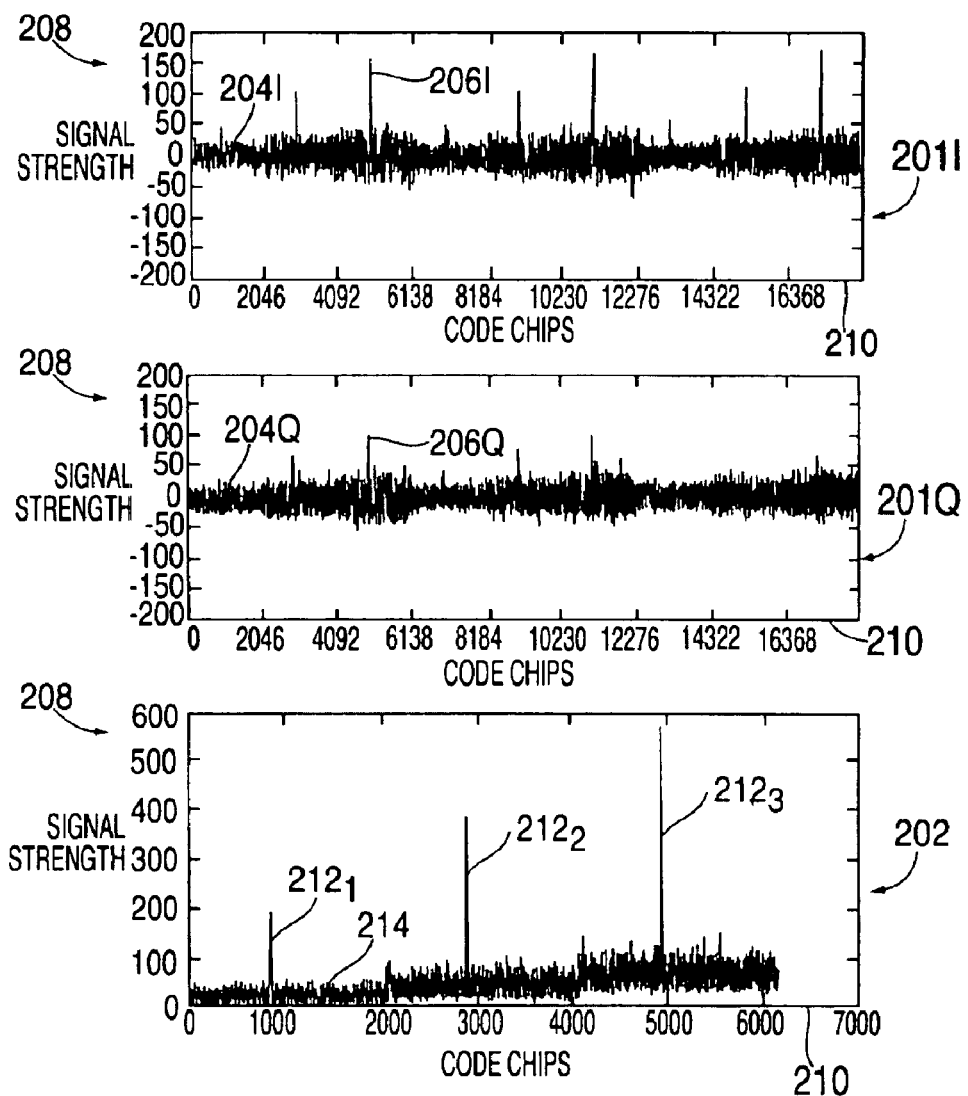
FIG. 2 shows an example of waveforms produced by the invention.

FIG. 2 depicts waveforms 201I, 201Q and 202 generated by the components of FIG. 1. The waveforms 201I, 201Q and 202 are plots of signal strength (axis 208) versus code chips (axis 210). The waveforms depict the output of the convolution processor 109 during coherent integration and magnitude integration. For clarity, only 9 milliseconds of signal processing time is shown consisting of 3 magnitude accumulations each based on 3 coherent integrations. In the example, P=2, so there are 2046 signal samples per coherent integration. Waveforms 201I and 201Q are the output from the convolution processor 109 where 201I is the I-component of the output and 201Q is the Q-component. Each block of 2046 samples is a full convolution result, generated in real time by the convolution processor 109 from the 2046 signal samples processed during the interval. The convolution result contains noise except in the vicinity of a single peak (such as indicated by reference numbers 206I and 206Q) corresponding to the time delay of the signal. The signal repeats every epoch, so the peak reappears each 2046 samples. Over the first three cycles, correlation results are accumulated in the RAM 110a and 110b by summing values at corresponding delays from each epoch. (For example, the values at output time 4 are summed with the values at output time 2050 and 4096.) The correlation peak always appears at the same delay offset and the size of the peak increases over the accumulation, roughly tripling over 3 epochs. The level of the noise also increases, but rises only as the square root of 3 because the noise correlation is uncorrelated from epoch to epoch. The signal to noise ratio improves through the accumulation process, increasing by roughly the square root of 3. Waveform 201Q illustrates the same signal accumulation process occurring in the quadrature channel.

Beginning with the 4th cycle of the signal, the signal RAMs 110a and 110b are cleared to zero, and the signal accumulation process begins again. Waveforms 201I and 201Q show the correlations accumulating and dumping 3 times over 9 signal epochs.

At the end of the coherent averaging interval, the accumulated signal's magnitude is computed and summed into the magnitude RAM113. The signal in the magnitude RAM 113 is shown as waveform 202. In the example, the waveform 202 updates three times corresponding to the completion of each coherent integration. The peaks are identified by reference numbers 212$_1$, 212$_2$, 212$_3$ and noise is identified by reference number 214. As can be seen, the signal-to-noise ratio increases with each magnitude accumulation, further enhancing the ability of the system to identify the peak corresponding to the time of arrival.

It should be noted that in the example, the complex phase of the signal varied over the 9 epochs. In particular, the signal was initially present in both I and Q channels, but by the final epoch, had rotated so that the signal was strong in the I channel and nearly absent in the Q channel. As mentioned above, imperfect Doppler shift tuning and other effects cause this rotation. Over many epochs, the phase would rotate through many cycles, resulting in cancellation of the signal when accumulated. For this reason, the inventive receiver accumulates coherently over only a short interval, relying on magnitude (non-coherent) accumulation for long term averaging. Magnitude values are independent of phase, and may be successfully integrated over several seconds.

Figure 3:
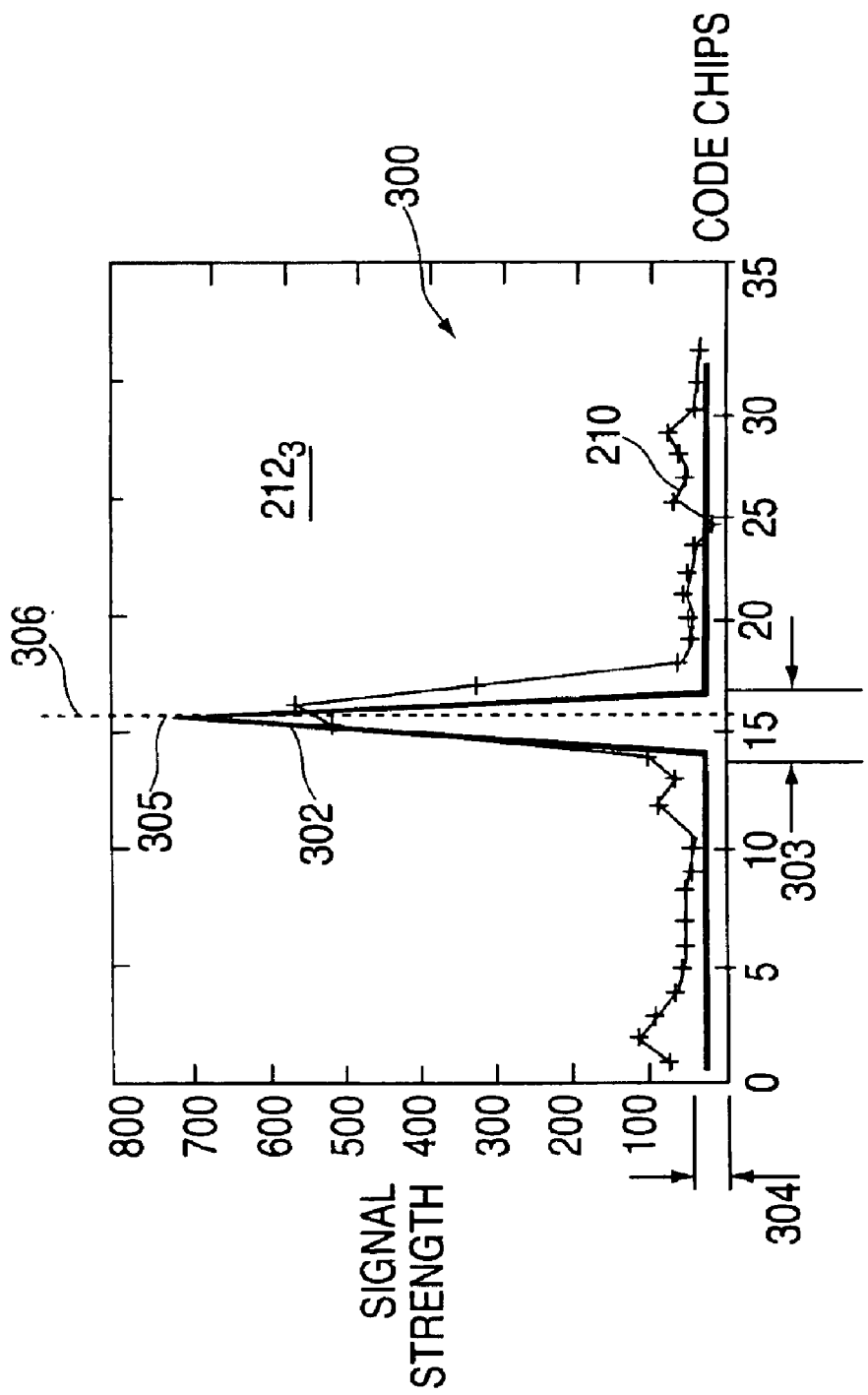
FIG. 3 shows details of an accumulated magnitude waveform of FIG. 2.
Figure 4:
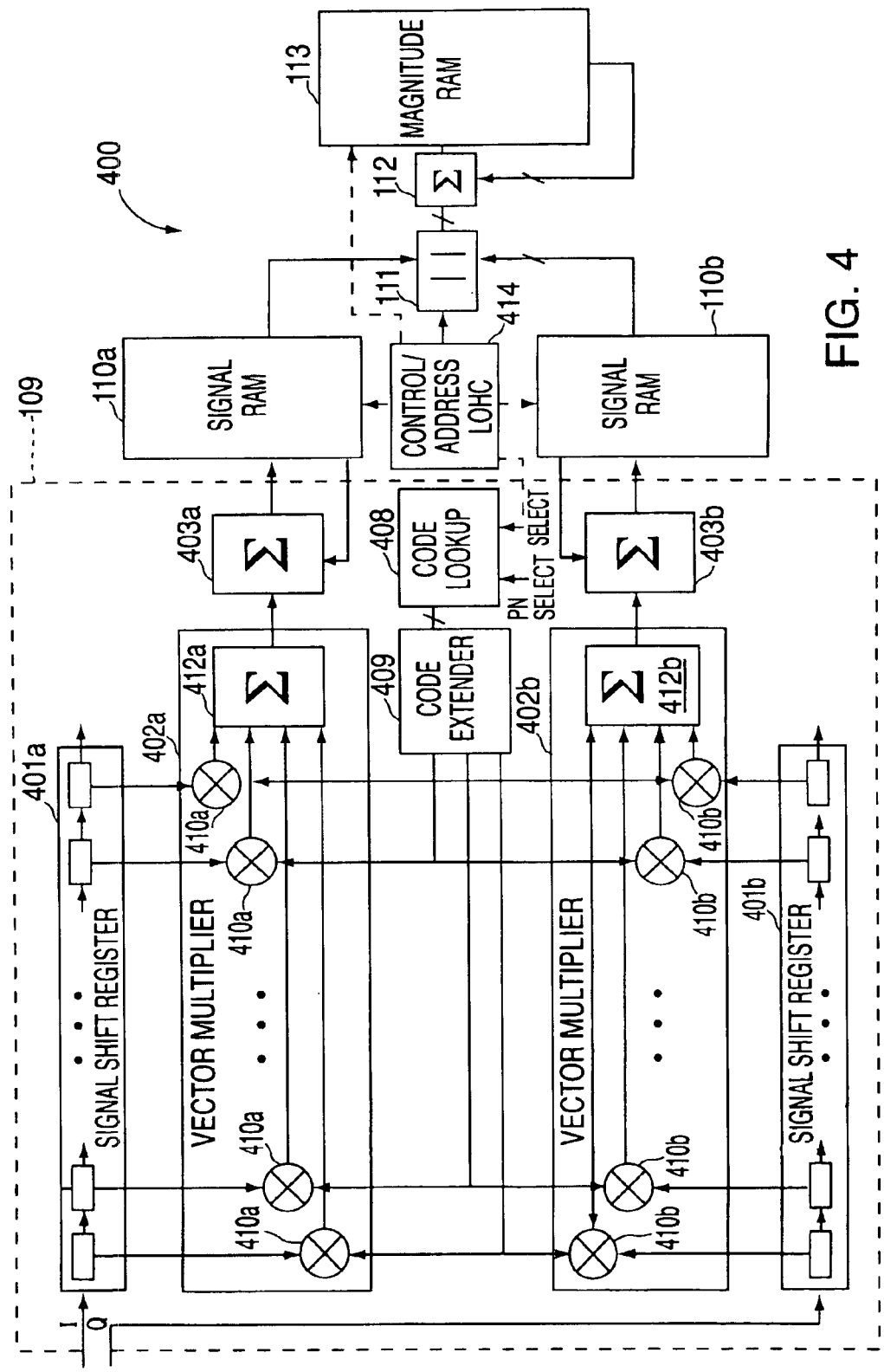
FIG. 4 shows a detailed block diagram of the convolution processor and the convolution results processing circuits.
Figure 5:
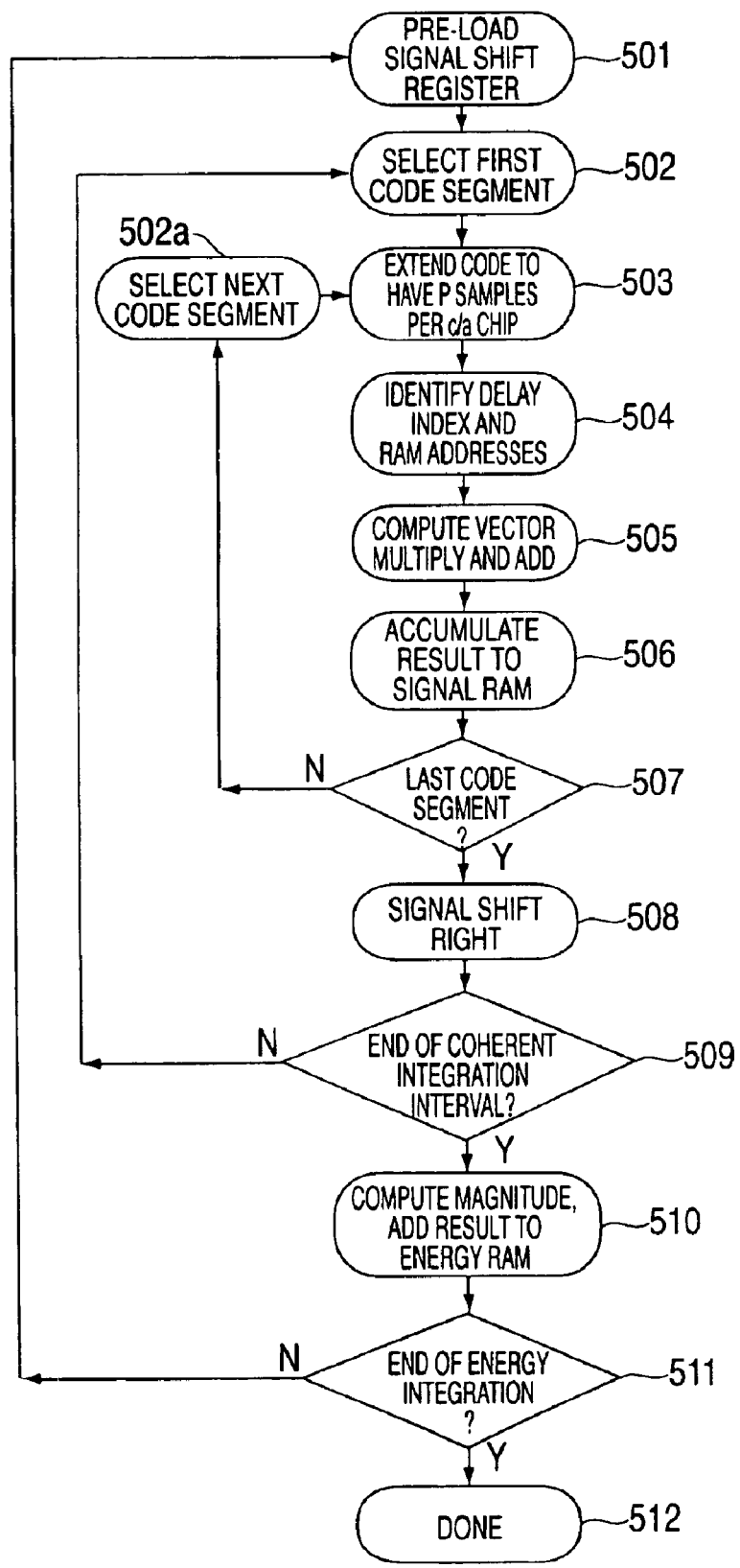
FIG. 5 depicts a flow diagram of a method of operation of the invention.

FIG. 3 illustrates the accumulated magnitude waveform 202 in greater detail. The plot 300 shows the magnitude of the convolution in the vicinity of a peak $212_3$ corresponding to the time delay of the signal. Points on the code chip axis 210 are spaced at an interval equal to the C/A code chip length divided by P, where P is the ratio of the signal sampling rate to $f_o$, the C/A code chipping rate. In the example, P=2, so the points are spaced at ½ chip intervals, or approximately 500 ns. (This spacing in time corresponds to a range difference of 150 meters). In order to achieve pseudorange measurements on the order of ten meters or better, the convolution results are further processed, typically in the CPU 114, to produce the position information. There are numerous interpolation techniques that can be used to estimate the true time delay, using the discrete correlation values provided by the convolution process. One embodiment uses a least squares estimation technique to identify parameters of a signal that best fits the noisy measured data. The ideal response of a signal is the magnitude of the autocorrelation of the signal. This waveform can easily be shown to have the form of a raised triangle 302. The width 303 of the triangle base is exactly 2 C/A code chips, or 4 points on the convolution result (for the P=2 case). The height 304 of the base of the triangle is the magnitude of the noise in the convolution for time delays not corresponding to the signal. The magnitude of this noise can be estimated from the data or pre-calculated based on design parameters, such as the amplifier noise figure, cable and filter loss and system temperature. The peak 305 of the triangle and the center 306 of the triangle are unknowns corresponding to the signal magnitude and time delay. The least squares method can be used to estimate these two parameters so as to fit the noisy data points to a triangle with a given peak and center. FIG. 4 depicts a detailed block diagram of the convolution processor 109 (as well as the convolution results processing circuits 400), in particular details showing how a full convolution is generated by repeated use of a small block of circuitry. Operation of the circuits can be best understood with simultaneous reference to FIG. 4, a flow diagram of FIG. 5 representing the operation of the processor 109 of FIG. 4, and by comparison of the simple examples of FIG. 6 and FIG. 7.

Signals from the decimation circuit 107 are coupled to shift registers 401a and 401b, handling I and Q components, respectively. Each shift register 401a and 401b is of length P×K, where P is the desired number of samples per C/A code chip, and K is chosen as a design parameter. As will be explained K is a factor of 1023. To simplify the discussion, the remainder of the discussion focuses on one particular embodiment with P=2 (samples spaced ½ chip apart) and K=33. This means of advancing the signal through the shift register eliminates the need for circuitry to double-buffer the signal, reducing the cost and complexity of implementation.

Signals advance through shift registers 401a and 401b at the rate of $2f_o$, as timed by the code NCO 108. The signals remain in place in the shift registers for many clock cycles, so that a series of partial correlation operations can be performed. Specifically, a total of M partial correlations are performed, where M=1023/K or 31 in this example. Each partial correlation consists of a fast vector multiply and add operation between the contents of each signal shift register and a segment of the code containing P×K (e.g., 66) code samples. The fast vector multiplication and addition occurs in circuits 402a and 402b. Circuits 402a and 402b respectively comprise multipliers 410a and 410b and summers 412a and 412b. The operation consists of multiplying each of the 66 signal samples in the signal register 401a or 401b by 66 code samples (formed by extending 33 code samples with the code extender 409), and summing the results in summer 412a and 412b. The operation occurs separately and simultaneously in the I and Q channels. Mathematically, this operation is referred to as an inner product, defined as $$\sum_{i=1}^{P \times K} <signal_i> <code\ c_i>$$

The output of the vector multiply and add may be re-quantized to keep the numbers in a small range so as to avoid overflowing RAMs 404a and 404b. For simplicity, the quantizer is not shown. In one embodiment, the re-quantization is to 2 bits of resolution.

The results of the vector multiply and add are accumulated by adders 403a and 403b and processed by the convolution results processing circuits 400. Circuits 400 comprise signal RAM 110a, 110b, complex normalizer 111, adder 112 and magnitude RAM 113. The accumulation process consists of reading from RAM 110a and 110b the current values for a particular time delay, adding the just computed partial correlations, and writing the sums back to RAMs 110a and 110b. By properly combining partial correlations that correspond to a particular time delay, the full correlation for that delay is computed. As described previously, the process continues for as many epochs of the signal as desired to enhance signal to noise ratio. Thus, the adders 403a and 403b serve two purposes: the combining of partial correlations within an epoch; and the accumulation of correlations across several epochs.

The outputs from signal RAMs 110a and 110b are combined in complex normalizer 405 to form the magnitude of the signal. The I and Q waveforms in these RAMs 110a and 110b can be viewed as the real and imaginary part of a complex waveform. Forming the magnitude consists of squaring each component, summing the results, and taking the square root of the result. There are several approximations to the magnitude that can be used to simplify circuitry. In one embodiment, the complex magnitude is approximated by taking the scalar magnitude of I and Q signals independently and determining which is larger. The magnitude can be approximated by taking the larger magnitude and adding it to the one half of the smaller magnitude.

The results of the magnitude operation may be scaled to keep the values in a small range so as to avoid overflowing RAM 113. For simplicity, a scaler is not shown. In one embodiment, the scaling consists of shifting the result by 3 bits (i.e., divide by 8).

It would also be possible to accumulate signal powers rather than signal magnitudes. In this case, the operation in 405 would be power estimation, typically computed by taking the sum of the squares of the I and Q signals. In this case, the pseudorange determination algorithms described in reference to FIG. 3 would have to be slightly modified to perform a fit against a power waveform as opposed to a magnitude waveform. Alternatively, additional nonlinear operations could be used to generate values representative of the magnitude or power of I and Q signals.

The output from complex normalizer 111 is accumulated by the adder 112 into magnitude RAM 113. The accumulation process consists of reading from RAM 113 the current magnitude value for a particular time delay, adding in the just computed magnitude result, and writing the sum back to the RAM 113. As discussed previously, the magnitude accumulation continues for as many cycles as required to achieve signal to noise ratio enhancement.

The vector multipliers 402a and 402b perform M partial correlations for each shift of the signal. A code lookup circuit 408 generates the reference code samples for each partial correlation. The lookup is controlled by two lookup indexes. First, the code must be selected from 1 of 32 codes. This selection is constant through the convolution process and is established when the processing channel is configured to correlate for a particular satellite signal. The second index is a segment index between 1 and M. Each C/A code consists of 1023 chips, which are divided into M non-overlapping segments each consisting of K adjacent code chips. The lookup index identifies which code segment is needed. The output from the code lookup circuit is K chips comprising the segment. The selection process is controlled by Control/Address Logic 414.

The code extender 409 takes as its input K chips of a segment and extends the segment into K×P code samples. The extension operation consists of converting each code chip into P identical code samples. The output from the code extender 409 forms the reference code input to vector multipliers 402a–b. In the example, the output from the code extender is 66 samples made up of 33 unique values, each replicated twice.

The architecture shown in FIG. 4 requires a clock that is substantially faster than the C/A code rate $f_o$. For example, if two samples per C/A code chip are used (P=2) and K and M are to be 33 and 31 respectively, achieving the full convolution requires performing 31 partial correlations for each shift of the signal shift register, which advances at rate $2 \times f_o$. Typically, at least two clock cycles are required to read and write RAMs 110a and 110b. Assuming two clock cycles, the minimum clocking rate required to achieve the full convolution is:

$$f_{clk} = 2 \times 31 \times 2 \times f_o = 2 \times 31 \times 2 \times 1.023 \text{ MHz} \approx 127 \text{ MHz}$$

This rate is easily achievable in modern integrated circuit logic.

It should be noted that the invention could also be used to compute a subset of the full convolution. In this case, fewer than M partial correlations are performed for each shift of the signal shift register. In this case, the total range of delays will be less than the P×1023 making up a full convolution. In particular if $M_2$ partial correlations are performed, then $M_2$ times K times P delay values are generated. The clocking rate to the processor is reduced by the ratio of $M_2$ to M. Furthermore, the size of the RAMs is reduced by this ratio as well. Thus, this alternative may be useful in systems that do not have the computation or memory resources to process the full convolution.

Other choices for K and M result allows further design tradeoffs to be made, however, since the prime factors of 1023 are 3, 11, and 31, the choices for K and M are limited. Reducing K is desirable since this reduces the size of the shift registers 401a and 401b and the complexity of the vector multipliers 402a and 402b, but requires a larger M and therefore a large clocking rate. The choices for K are 3, 11, 31, 33, 93. These choices would require clocking rates of 1.39 GHz, 380 MHz, 135 MHz, 127 MHz, and 45 MHz respectively (always assuming P=2 and 2 clock cycles per partial correlation.) Based on the technology available at the time of the demonstration, the K=33 choice was made for one embodiment. With future technologies, the choice of K=11 and a clock rate of 380 MHz may become viable and would result in a further reduction of the logic complexity. Thus, the architecture has the desirable attribute of supporting optimized tradeoffs between speed and logic complexity.

The sequencing of code segments is controlled by control logic 414. This control logic also identifies the correct addresses for the RAMs 110a, 110b and 113. As will be discussed below, the partial correlations are generated in a non-sequential order, thus the generation of RAM addresses is non-trivial.

The operation of the circuits of FIG. 4 can also be understood by reference to the flow diagram of FIG. 5. Operation begins at step 501 with pre-loading of the signal shift registers 401a and 401b. At this point, convolution processing can begin. At step 502, a code segment is accessed for the particular partial correlation. At step 503, the code segment is extended by the code extender to have P samples per C/A chip. Next, at step 504, the delay index and corresponding RAM addresses are computed. The delay index indicates which point of the full convolution will be updated by the partial correlation. As will be apparent from the example discussed in conjunction with FIG. 7, the delay index jumps around in a non-linear, but deterministic manner. The address computation is a function of the number of signal shifts and the code segment.

At step 505, the partial correlation is computed using the vector multipliers 402a and 402b. At step 506, the result is accumulated into the signal RAMs at the location indicated by the delay index. Next at step 507, a check is made to determine whether the processing has reached the end of the coherent integration interval. If not, the method returns back to step 502a, and repeats for the above steps for the next code segment.

If, at step 507, the check indicates that partial correlations are complete for all code segments (e.g., 31 partial correlations), the method proceeds to step 508. At step 508, the signal registers 401a and 401b are shifted by one sample.

The process then moves to step 509, where a check is performed to see if the last shift encountered the end of the coherent integration interval. If not, the process cycles back to the start at step 502. If the check indicates the end of the coherent integration interval, then the method continues to step 510, where the signal magnitude is computed by complex normalizer 111. The result is added using adder 112 and stored in the magnitude RAM 113. Next, at step 511, a check is made to determine if all magnitude accumulations have been performed. If so, the method completes at step 512. If not, processing continues by performing the next partial correlation at step 501.

Figure 6:
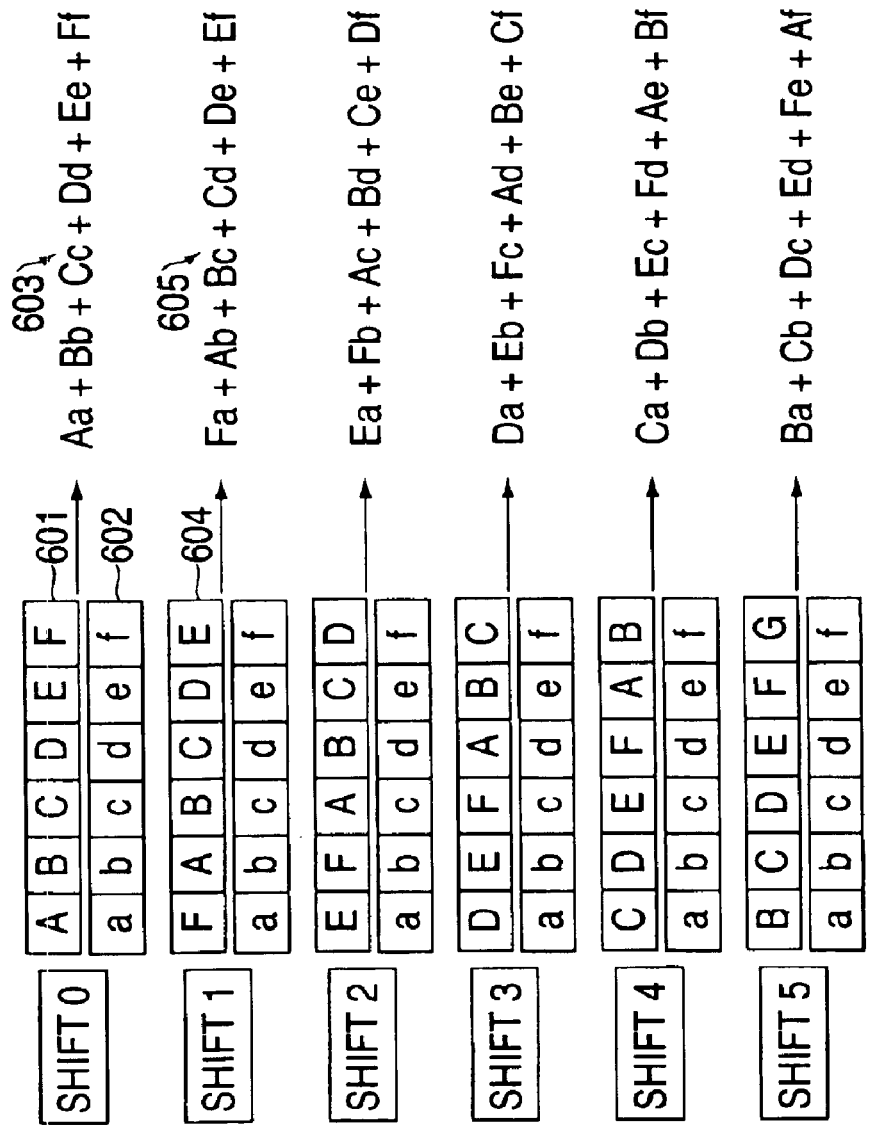
FIG. 6 graphically illustrates a simplified example of computing a full convolution in the traditional manner.
Figure 7:
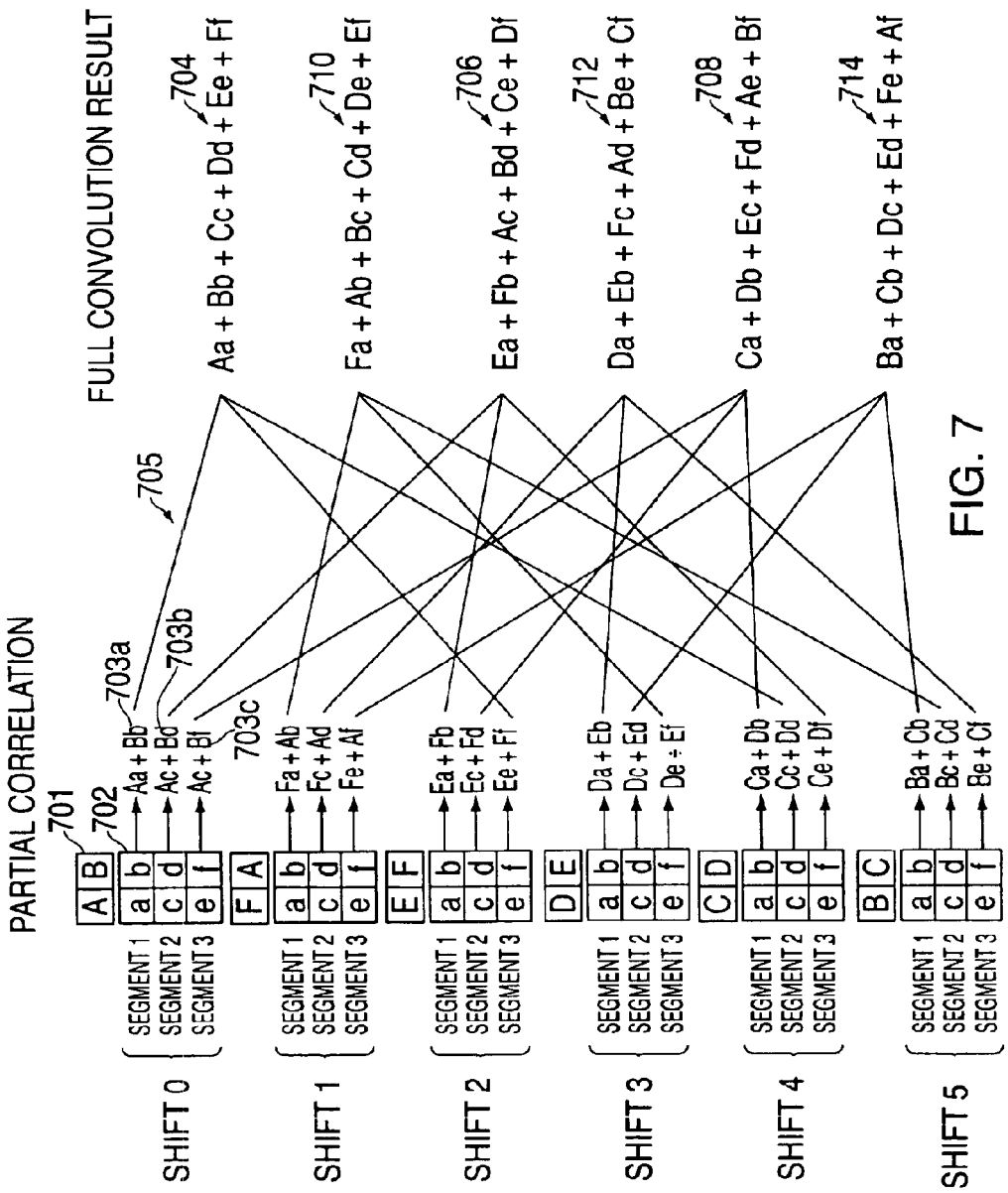
FIG. 7 graphically illustrates how the full convolution of FIG. 6 is performed using the invention.

FIG. 6 and FIG. 7 illustrate, through a simplified example, how the invention utilizes partial correlations to accumulate a full convolution result. For clarity, these diagrams illustrate convolution of a very short length 6 code, as opposed to the length 1023 C/A code of a GPS signal. To further simplify the example, one sample per code chip is used, i.e. P=1. FIG. 6 illustrates convolution through a standard matched filtering approach, and FIG. 7 illustrates the identical convolution through the method of combining of partial correlations. The details of FIG. 7 are helpful in understanding overall operation of the invention. Both methods generate identical convolution results.

FIG. 6 shows the operation of a conventional matched filter for a length 6 signal. Operation begins at a moment in time indicated as shift 0. At this moment, 6 consecutive signal samples comprising an entire cycle of the signal are in the signal shift register 601. Individual samples are labeled with uppercase indices A, B, C, D, E, and F. Code samples for the entire length 6 code are held in reference register 602 and are labeled with lowercase indices a, b, c, d, e, and f. At the time of shift 0, a vector multiplication and add is performed to generate the correlation result for shift 0. Each signal sample is multiplied by a corresponding code sample and the results are summed to yield correlation result 603.

Next, the signal shift register 604 is advanced by one sample, as indicated by shift 1. The signal is periodic, so the new sample introduced at the left side of the register is identical to that shifted out to the right. The shifted contents of the register 604 are now samples with indices F, A, B, C, D, and E. The code is not shifted. The vector multiplication and addition now yields a correlation result 605 for shift 1. This process of shifting continues for 5 additional shifts, at which point all 6 correlation results making up the full convolution are available.

FIG. 7 illustrates how the same convolution result can be obtained through the method of partial correlations. As described, the invention requires that the code be factored into M segments of length K. In the simplified example of FIG. 7, the length 6 code was factored into 3 segments of length 2, i.e. K=2 and M=3. Operation begins at a moment in time indicated at shift 0. At this moment, two signal samples are held in the signal shift register 701. The signal samples are labeled with uppercase indices A and B. The 6 samples of the code are contained in 3 segments each of length 2. The first code segment 702 contains 2 code samples labeled with lowercase indices a and b. The signal is held in place for 3 partial correlation operations, resulting in partial correlation results 703a, 703b and 703c. The first partial correlation result is created by a vector multiplication and addition between the contents of the signal register and the first code segment (segment 1). The second and third results are created by vector multiplications of the signal register with the second and third code segments respectively. Note that the signal register is held in place for a sufficient time for all three-vector multiplications to be performed, and that the code is not shifted during this time, rather different code segments are selected.

The partial correlation results are accumulated into the memory according to the signal paths 705. For example, at shift 0, the partial correlation from the first code segment sums into the correlation result 704. The partial correlation from the second segment sums into the correlation result 706 for shift 2. The partial correlation from the third segment contributes to the correlation result 708 for shift 4.

After three partial correlations, the signal is shifted. At this stage, indicated as shift 1, the signal register contains samples F and A. Again, three partial correlations are generated with the same three code segments as before. The results from these partial correlations contribute to correlation results 710, 712, 714 respectively for shifts 1,3, and 5. The process continues for 4 additional signal shifts, at which time the full convolution result is available. As can be seen, the operation requires generating a total of 18 partial correlations that contribute to the 6 full results comprising the convolution.

The architecture described by FIG. 7 illustrates two important properties of the invention. First, it is apparent that the full convolution was produced for a length 6 code using only a shift register and vector multiplication and addition unit of length 2. This requires less circuitry than the FIG. 6 where these elements are of length 6. Second, in FIG. 7, the code samples are accessed in fixed segments that are the same for each shift, and each segment is a separate non-overlapping section of the code. Thus, a simple lookup or register scheme can be used to provide the code to the vector multipliers, as will be discussed further in reference to FIG. 8 and FIG. 9. These schemes require less circuitry than other architectures that might, for example, require large blocks of code bits to be made available in a more complex set of permutations. The invention also eliminates the need to provide code generation circuitry.

Figure 8:
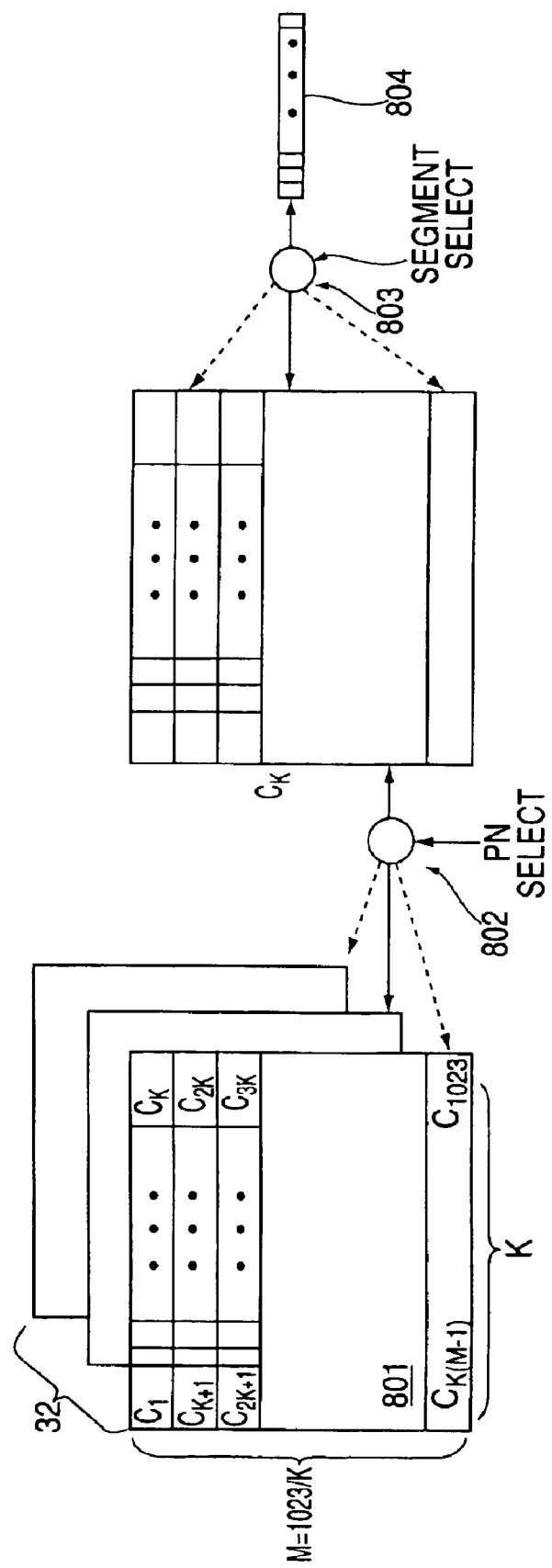
FIG. 8 illustrates an embodiment of a code lookup apparatus suitable for use in the invention.

FIG. 8 shows a block diagram of one embodiment of a code lookup circuit 408 suitable for the invention. Table 801 contains stored values for all 1023 bits of each of 32 codes, for example in read-only memory (ROM) or hard-wired logic. The table 801 is organized as 32 sub-tables, one for each code. Each sub-table is further organized as M segments of length K where K×M=1023, and K and M are chosen as described previously. Multiplexer 802 selects a particular code based on a select value. The output of multiplexer 802 is a particular sub-table for the desired. Multiplexer 803 selects a particular segment based on a segment select value between 1 and M. The output of 803 is a particular code segment 804, of length K, which contains code bits provided to code extender 409.

It should be noted that multiplexer 803 must be high speed in order to allow the code segment to be changed each partial correlation, i.e. every two clock cycles. For this reason, it is necessary that all code bits be pre-stored in table 801, as opposed to being generated on the fly in the traditional manner of a code generator.

The circuits of FIG. 8 are intended to be illustrative. In practice, there are many different circuit designs that are functionally equivalent. In particular, the process of logic synthesis used in modern ASIC design will lead to a certain pattern of gates that achieves a behavior equivalent to that described above but not necessarily using multiplexers in the manner described.

Figure 9:
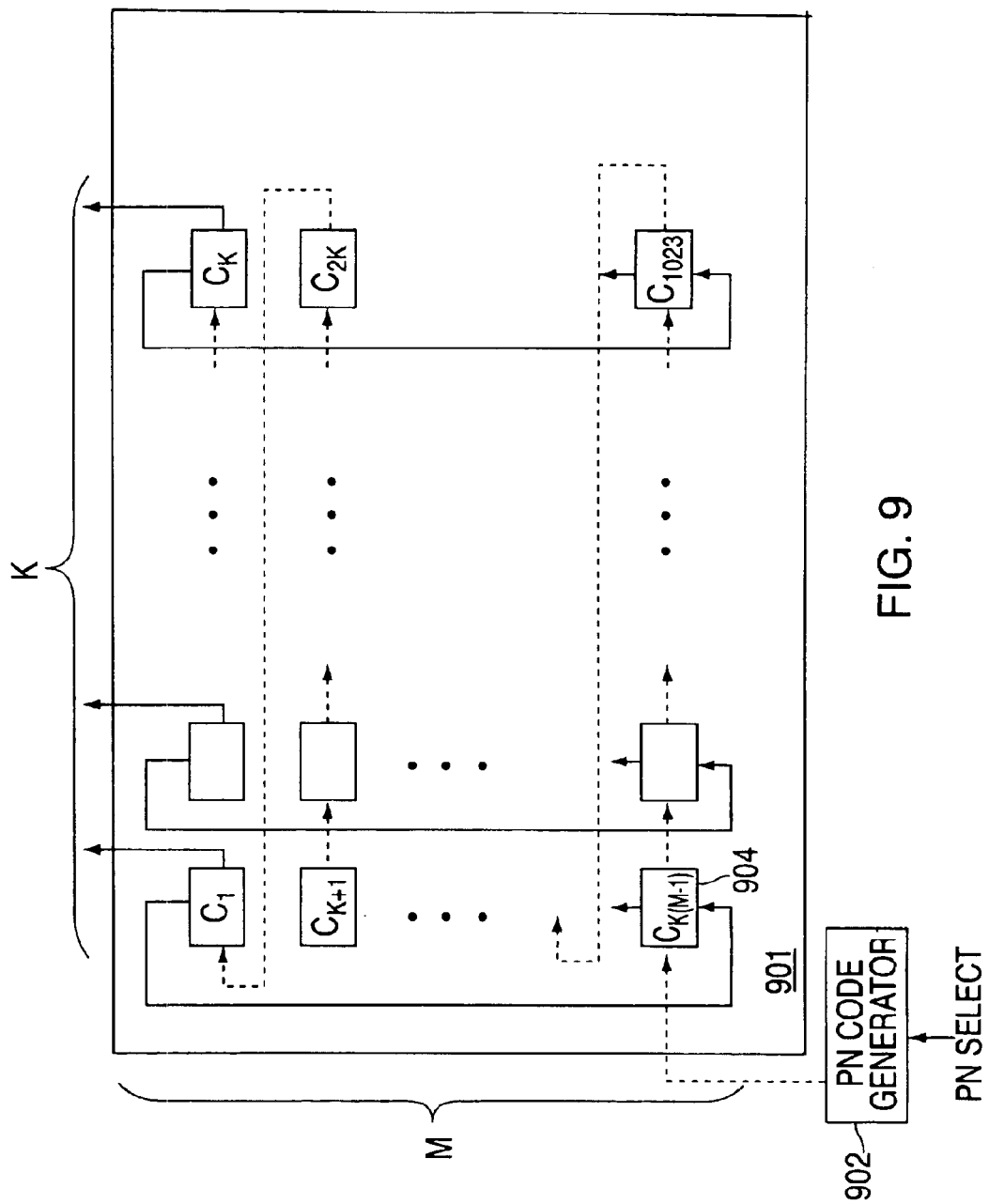
FIG. 9 illustrates an embodiment of a two-dimensional code shift register suitable for use in an alternate embodiment of the invention.

FIG. 9 shows a block diagram of an alternate embodiment of a code lookup circuit 408 suitable for the invention. The 1023 code bits corresponding to a particular code are held in 1023 dual-directional shift registers 901, organized as M rows of length K. The shift registers operate in two modes: a running mode, and a loading mode.

In the running mode, each register 901 is configured to shift its sample to the register above it in the next row, except for the top row of registers that shifts to the bottom row of registers. The shift directions for running mode are indicated by solid arrows within 901. By clocking all the registers, rows of code bits will circulate, such that at any one time the top row contains one of M code segments of length K. This top row of bits is provided to code extender 409. The registers circulate rapidly, so that a different code segment is made available for each partial correlation.

In the loading mode, each register is configured to shift its sample to the register next in its row, except for the last column of registers, which shift to the first column of registers in the row above. The shift directions for loading mode are indicated by dotted arrows within 901. The left hand lower shift register 904 is connected to code generator 902. The code generator is a traditional code generator, capable of sequentially creating the 1023 code bits of a particular code based on a select value. When the code lookup circuit is configured for a particular, the registers are placed in the loading mode, and the generator is used to generate the bits of the code, which then clock through the registers. After all bits have been clocked through, the code will reside in the registers as M segments of length K. The circuit is then ready for use in the running mode.

Figure 10:
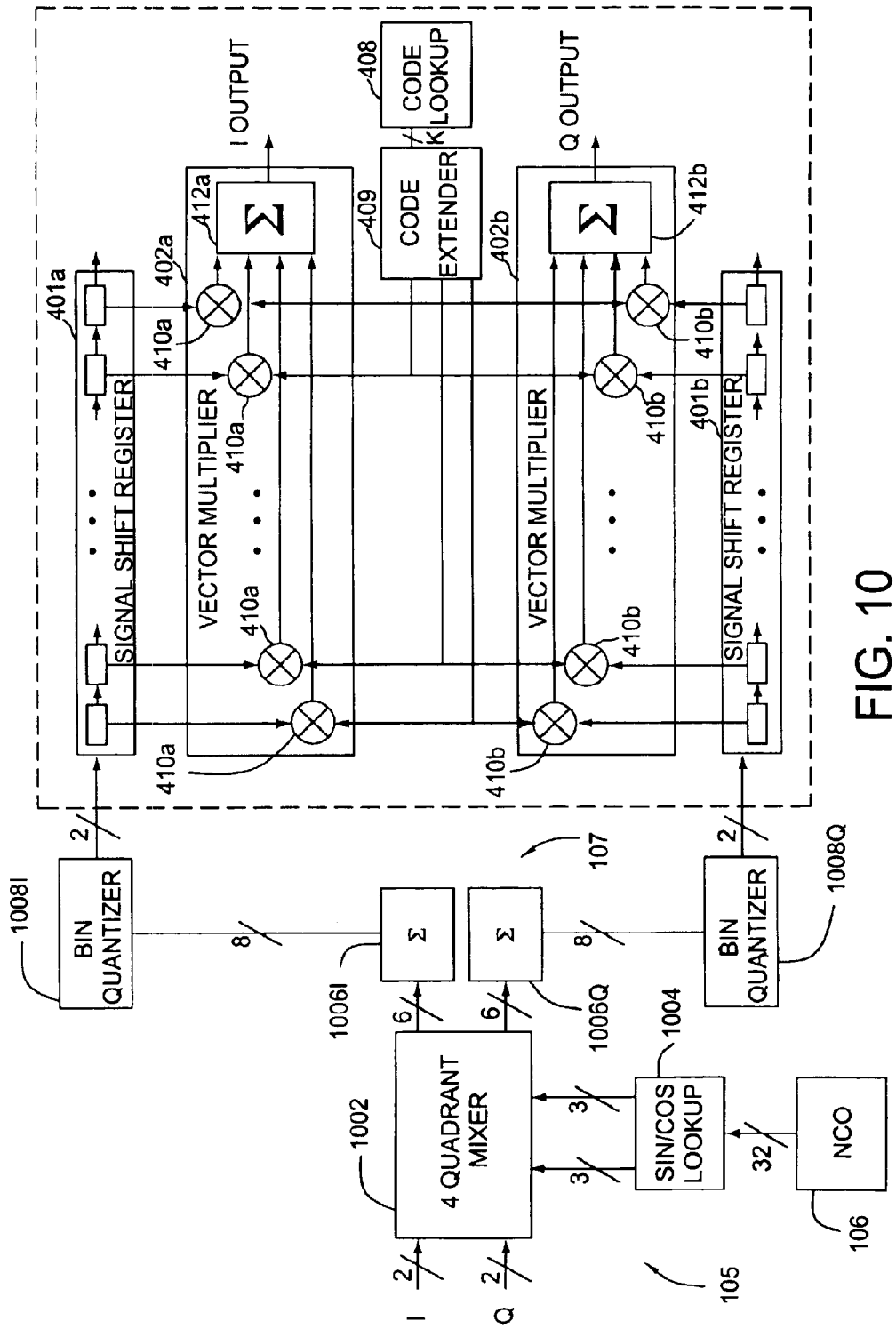
FIG. 10 depicts a block diagram showing a portion a GPS receiver having a quantizer at the input of the correlator.

FIG. 10 depicts a block diagram showing an alternative embodiment of a portion of the GPS receiver 100. Elements in FIG. 10 that are similar to those illustrated in FIGS. 1 and 4 are designated by the same reference number, and are not described in detail below. Only one processing channel $104_1$, is shown for simplicity. In the present embodiment, the output of A/D converter 1003 comprises a sampled signal having an I component and a Q component. The I and Q signals are preferably quantized to at least two bits and are in sign-magnitude format, taking on values −2, −1, 1, and 2. Those skilled in the art will appreciate, however, that the A/D converter 1003 can output I and Q signals in other formats, such as twos complement format or ones complement format.

The sampled I and Q signals from the A/D converter 1003 are coupled to the tuner 105. In the present embodiment, the tuner 105 comprises a four-quadrant mixer 1002 and a sin/cos lookup table circuit 1004. The I and Q signals are digitally tuned by a four-quadrant mixer 1002, which is driven by sine and cosine signals generated by the sin/cos lookup table circuit 1004. The sine and cosine signals are selected by the phase output of the numerically controlled oscillator (NCO) 106. The sine and cosine outputs of the sin/cos lookup table circuit 1004 are preferably quantized to at least three bits that can be integer values over the range of ±3. The outputs of the four-quadrant mixer 1002 are formed by multiplying each of the I and Q signals by a sine or cosine signal and adding or subtracting products. In this example, the four-quadrant mixer output is a pair of six-bit quantities.

The output of the tuner 105 is coupled to adders 1006I and 1006Q, which comprise a portion of the decimation circuit 107. As described above, in one embodiment, the decimation operation is a simple pre-summing operation that sums all the incoming signal samples over the period of an output sample. For example, and as discussed in reference to FIG. 1, the decimation circuit 107 can pre-sum as many as 5 incoming samples for each output sample. Since the I and Q tuner output signals are six-bit quantities, a total of eight bits are required to represent the output of adders 1006I and 1006Q.

To reduce the complexity of the convolution processor 109, it is desirable to reduce the number of bits in the representation of the samples input to the to the convolution processor 109. The present invention advantageously converts the output of the decimation circuit 107 to a reduced number of bits. Specifically, the outputs of adders 1006I and 1006Q are coupled to bin quantizers 1008I and 1008Q, respectively. In one embodiment, bin quantizers 1008I and 1008Q generate two-bit quantities from the eight-bit quantities output from adders 1006I and 1006Q. That is, bin quantizers 1008I and 1008Q "re-quantize" the I and Q signals to reduce the number of significant bits in each sample. Bin quantizers 1008I and 1008Q can be implemented by a set of comparators (not shown) that assign input values to output values according to a series of thresholds, as described below with respect to FIG. 11.

The I and Q outputs from bin quantizers 1008I and 1008Q are coupled to the convolution processor 109. The convolution processor 109 operates as described above, but on two-bit samples rather than nine-bit samples. Thus, the present invention reduces the overall complexity of the convolution processor 109. Specifically, the output of the vector multipliers 402a and 402b comprise an inner product of a portion of the input signal with a code segment for each of the I and Q channels. As described above, the size of the inner product can be less than a full C/A code period or an entire C/A code period, depending upon the specific embodiment implemented. The vector multipliers 402a and 402b add the contents of signal shift registers 401a and 401b, while sign correcting each individual register for the C/A code value. If each value in the shift register was a full resolution eight-bit quantity, the vector multipliers 402a and 402b would be extremely complex. For example, the sum of 66 eight-bit samples would require on the order of 14–15 bits to represent. With the bin quantizers 1008I and 1008Q, however, the sum of 66 two-bit samples can be represented in only 9 bits. Thus, the present invention leads to a major reduction in complexity of vector multipliers 402a and 402b, as well as adders 412a and 412b.

Figure 11:
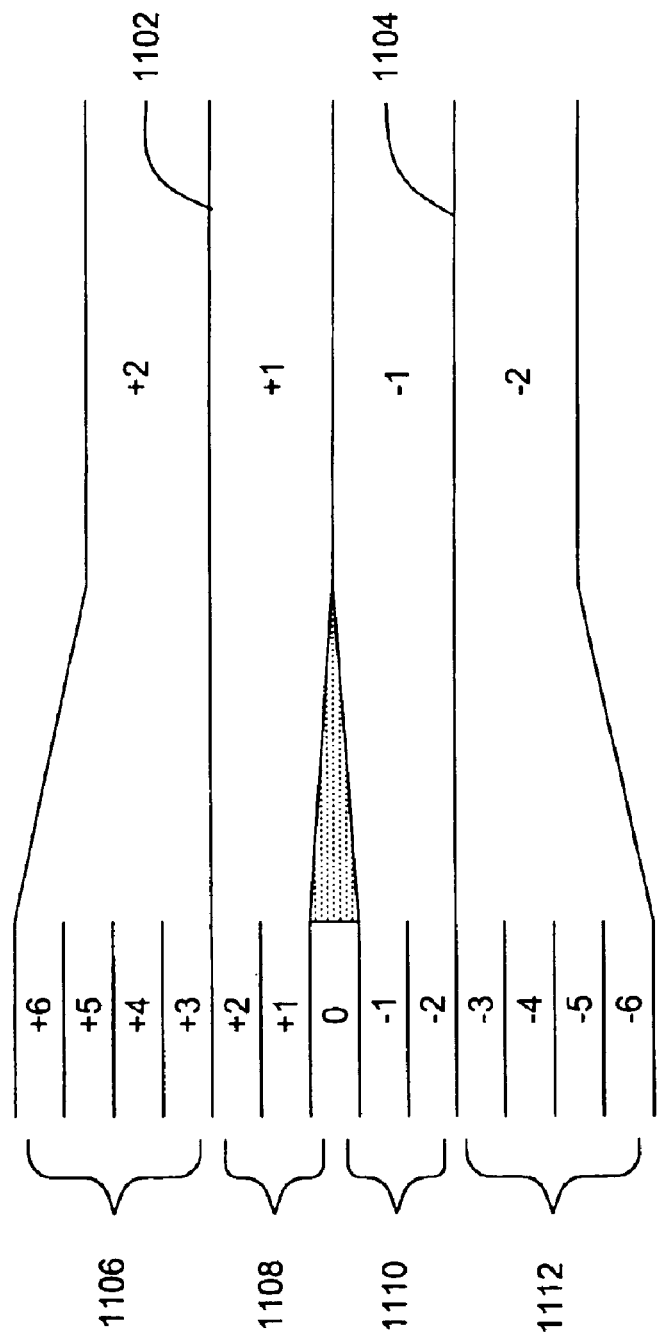
FIG. 11 graphically illustrates a bin assignment procedure within a quantizer in accordance with embodiment of FIG. 10.

FIG. 11 graphically illustrates an exemplary bin assignment procedure performed within bin quantizers 1008I and 1008Q using two-bit quantization. Only levels from −6 to 6 are shown for simplicity. If the output of adders 1006I and 1006Q are eight-bit quantities, the levels actually range from −128 to 128. In one embodiment, positive value input samples 1106 to the bin quantizers 1008I and 1008Q that exceed a magnitude threshold 1102 are assigned a decimal value of "+2". Positive value input samples 1108 that are below the threshold 1102 are assigned a decimal value of "+1". Likewise, negative value input samples 1112 that are below a magnitude threshold 1104 are assigned a "−2" decimal value, and negative value input samples 1110 that are above the magnitude threshold 1104 are assigned a "−1" decimal value. The four possible output values (−2, −1, 1, 2) are encoded using two bits. Essentially, the input samples to the bin quantizers 1008I and 1008Q are "binned" into output samples having a particular value in accordance with one or more thresholds. The number of bins and thresholds is determined by the quantization resolution used.

Since there is no representation for zero in the two-bit encoding, zero values input to the bin quantizers 1008I and 1008Q are arbitrarily assigned a decimal value of 1 or −1. In one embodiment, the choice can be random, for example, driven by a pseudorandom counter circuit. Alternatively, the choice can be made by alternating between decimal values 1 and −1. An important characteristic of the assignment process is that, over the long term, an equal number of positive and negative values are generated, so that the bin quantizer output mean value does not become biased.

To achieve the best performance from a two-bit quantizer, the magnitude thresholds 1102 and 1104 should be adjusted to match the standard deviation of the noise at the bin quantizer input. This in turn will depend on the number of input samples being added in the pre-summing operation of the decimation circuit 107, the scaling of the tuner 105, and the noise statistics at the A/D converter 1003 output. The noise statistics of the A/D converter 1003 are a function of the RF design. Typically, automatic gain control (AGC) is used to maintain the analog threshold in the A/D converter 1003 at the noise standard deviation. In this case, the standard deviation of the A/D output is approximately 1.4, assuming that the A/D levels are assigned to values ±1 and ±2. The standard deviation at the bin quantizers 1008I and 1008Q, and therefore the best selection of magnitude thresholds 1102 and 1104, are computed as follows:

$$\sigma_{quantizer\ input} = G_{tuner} \times \sqrt{N_{presummer}} \times \sigma_{A/D\ output}$$
$$= 3 \times \sqrt{5} \times 1.4 = 9.39 \approx 9$$

where $G_{tuner}$ is the scaling of the tuner, $N_{presummer}$ is the number of samples that are added in the pre-summing operation, and $\sigma_{A/D\ output}$ is the standard deviation of the A/D output noise. The value of the tuner gain arises from the representation of the sine and cosine signals as values in the range of ±3. Thus, in the present example where the adders 1006I and 1006Q output eight-bit quantities, the magnitude thresholds 1102 and 1104 are +9 and −9, respectively.

Those skilled in the art will appreciate that the bin quantizers 1008I and 1008Q could reduce the number of bits to other amounts. The choice of two bits represents a tradeoff between complexity and signal to noise ratio loss. Specifically, the signal to noise ratio loss for small signals at very low noise ratios is a function of the number of bits used to quantize the signal and the relationship of quantization thresholds to the noise level. A two-bit quantizer, with the magnitude threshold set at the standard deviation of the noise, creates a small signal loss of about 0.7 dB. This compares favorably to a one-bit system, where the small signal loss is about 2.0 dB. The loss when using two-bit quantization is acceptable given the large complexity increases from using a larger number of bits for each sample.

Figure 12:
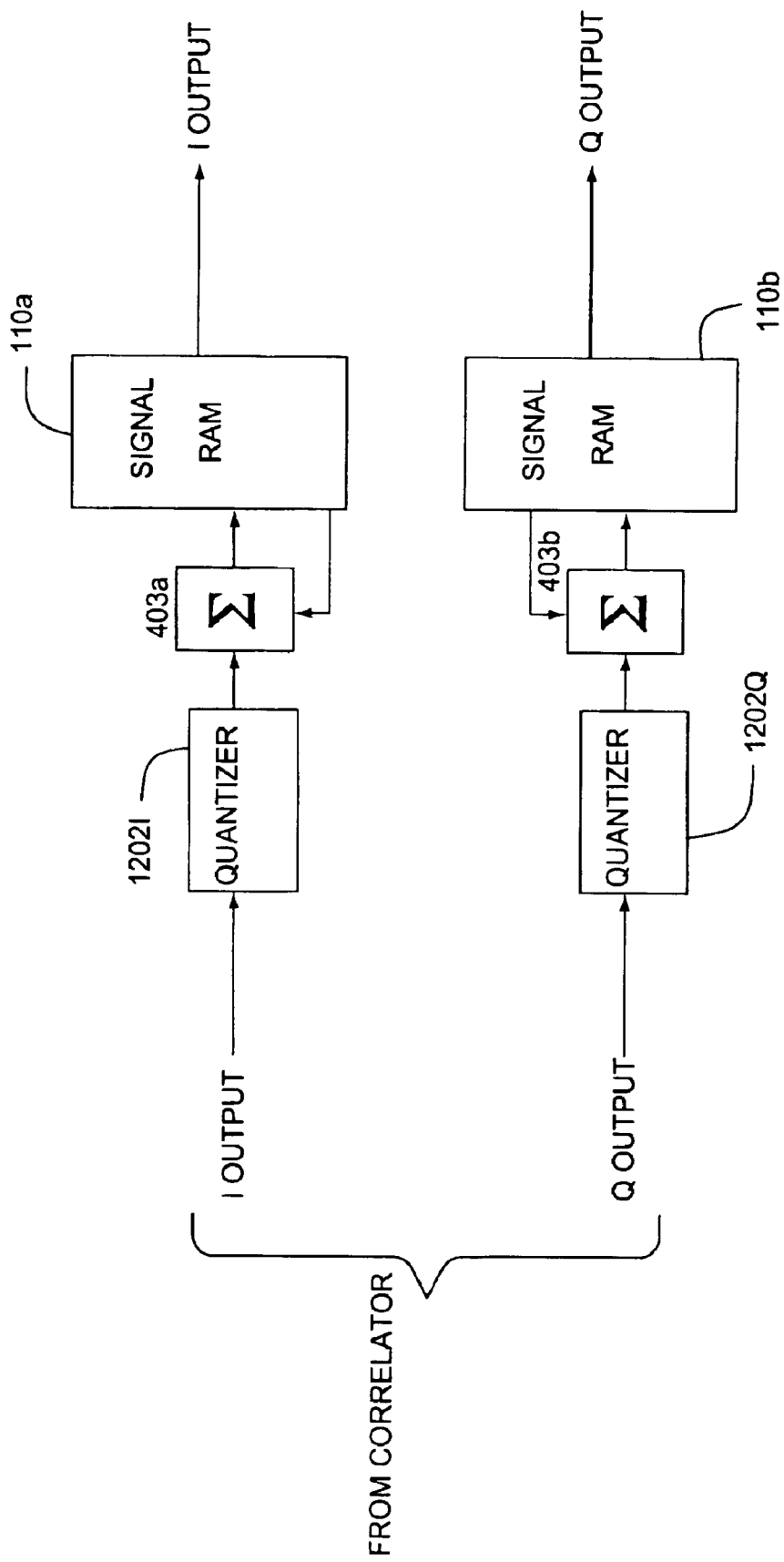
FIG. 12 depicts a block diagram showing a portion of a GPS receiver having a quantizer at the output of the correlator.

FIG. 12 depicts a block diagram showing another embodiment of a portion of the GPS receiver 100. Elements in FIG. 12 that are similar to those illustrated in FIGS. 1 and 4 are designated by the same reference number, and are not described in detail below. The I and Q outputs from the vector multipliers 402a and 402b are input to quantizers 1202I and 1202Q, respectively. As described above, the output of the convolution processor 109 can comprise samples having a large amount of bits. Quantizers 1202I and 1202Q reduce the number of significant bits before they are further processed (i.e, re-quantize the I and Q output signals from the convolution processor 109). As with the previously discussed bin quantizers 1008I and 1008Q, there is a tradeoff between the signal-to-noise ratio loss caused by quantization. In the preferred embodiment, two-bit quantization is used for quantizers 1202I and 1202Q, leading to an approximate 0.7 dB loss, and significant savings is complexity of the circuits executing the coherent integration and magnitude accumulation processes. The outputs of quantizers 1202I and 1202Q are coupled to adders 403a and 403b, respectively, for accumulation and storage in signal RAMS 110a and 110b (i.e., coherent integration).

Again, the quantizers 1202I and 1202Q can be implemented by a set of comparators that assign input values to output values according to a series of thresholds, in a similar manner as discussed previously with respect to FIG. 11. For best performance, the numerical value of the magnitude threshold should be adjusted to match the standard deviation of the noise. The optimum setting of quantizers 1202I and 1202Q can be computed from the standard deviation of the noise output from bin quantizers 1008I and 1008Q prior to the convolution processor 109, and the gain of the convolution processor 109. The former will be approximately 1.4 when two-bit quantization is used and the magnitude thresholds in the quantizers 1008I and 1008Q are set as described above. Therefore, the best magnitude threshold for quantizers 1202I and 1202Q can be computed as follows:

$$\sigma_{correlator\ output} = G_{correlator} \times \sigma_{quantizer\ output}$$
$$= \sqrt{66} \times 1.4 = 11.37 \approx 11$$

where $G_{correlator}$ is the gain of the convolution processor 109 and $\sigma_{quantizer\ output}$ is the standard deviation of the noise output from quantizers 1008I and 1008Q.

Figure 13:
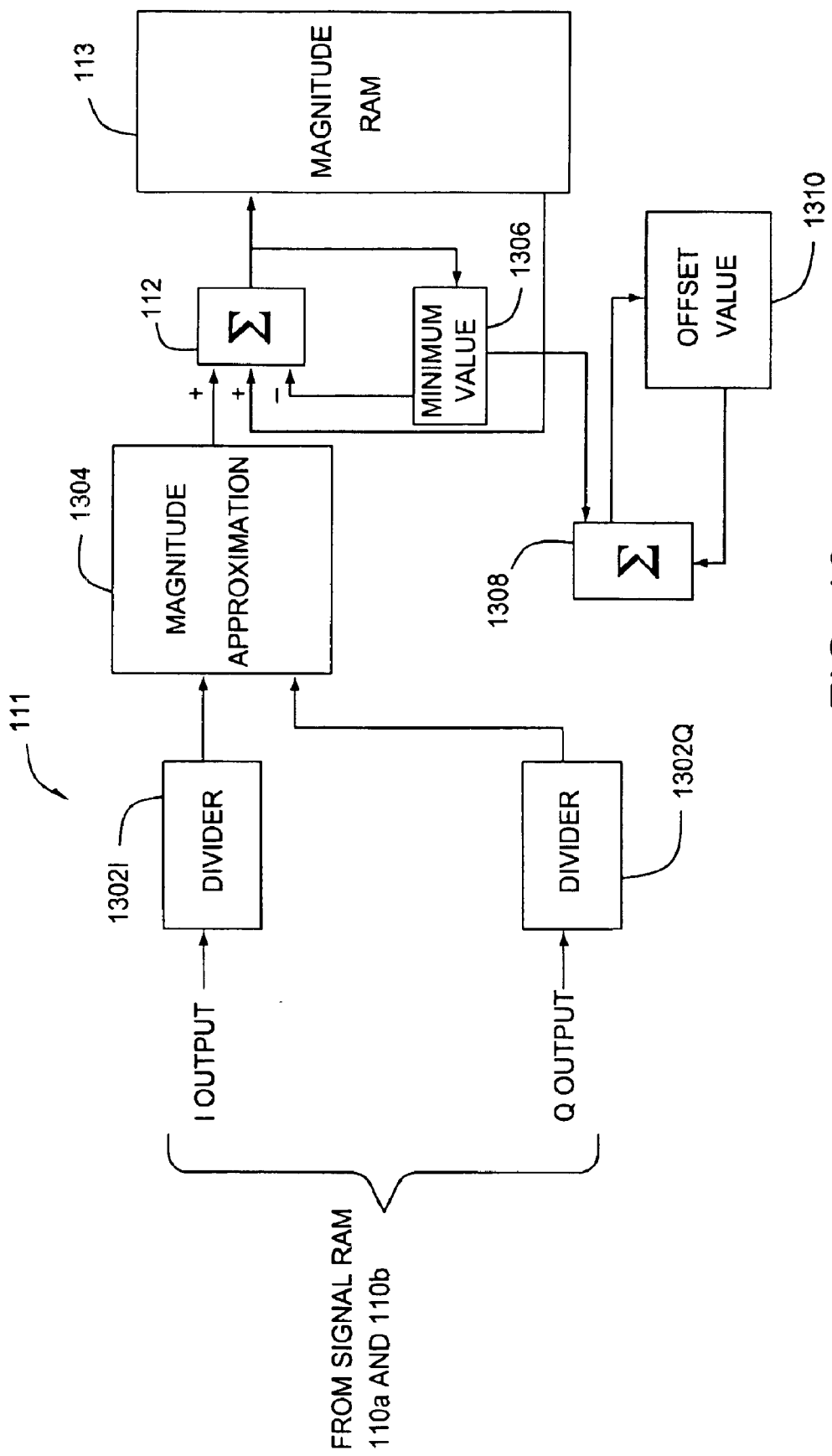
FIG. 13 depicts a block diagram of a magnitude accumulation circuit for use with the present invention.

FIG. 13 depicts a block diagram of one embodiment of a magnitude accumulation circuit 1300 for use with the present invention. As described above, after the convolution processor processes the input samples, the results are input to a coherent integration process and a magnitude accumulation process. Specifically, the output I and Q signals from the signal RAMS 110a and 110b are input to the complex normalizer 111. In the present embodiment, the complex normalizer 111 comprises dividers 1302I and 1302Q and magnitude approximation circuit 1304. Dividers 1302I and 1302Q reduce the number of bits of precision, so as to reduce the complexity of subsequent circuitry, and can be implemented with a binary shift. In this case, the scaled divider output standard deviation is:

$$\sigma_{divider\ output} = 2^N \times \sigma_{correlator\ output}$$

where $\sigma_{correlator\ output}$ is the standard deviation at the output of the convolution processor 109. So long as the quantity $\sigma_{divider}$ is significantly larger than the least significant bit after the divider 1302I and 1302Q, the signal-to-noise ratio loss through the division process is very minor. For example, in one embodiment, the divide ratio is chosen to ensure $\sigma_{divider} \geq 2$.

Figure 14:
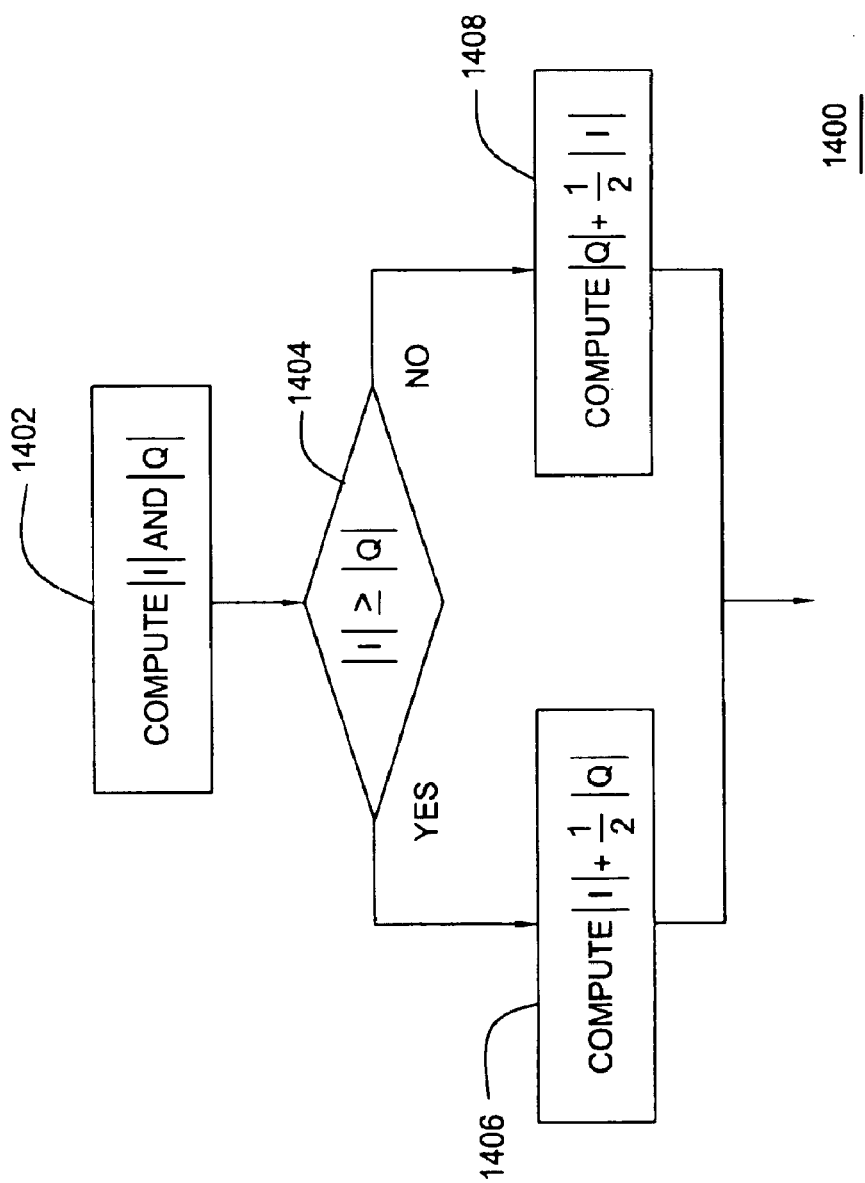
FIG. 14 shows a flow diagram illustrating a method of performing a magnitude approximation for the magnitude approximate circuit of FIG. 13.

The outputs of dividers 1302I and 1302Q are provided to a magnitude approximation circuit 1304, which provides a quantity representative of the complex magnitude of a waveform with real and imaginary parts represented by I and Q channels, respectively. FIG. 14 shows a flow diagram of a method 1400 of performing a magnitude approximation. In step 1402, the absolute value of the I and Q components are taken individually as scalar quantities. In step 1404, a comparison is made between the absolute values from step 1402. If the absolute value of the I component is greater than, or equal to, that of the Q component, then the magnitude is computed according to step 1406. Otherwise, the magnitude is computed according to step 1408. In particular, step 1406 computes the magnitude as follows:

$$\text{estimated magnitude} = |I| + \frac{1}{2}|Q|;\ |I| \geq |Q|$$

Step 1408 computes the magnitude as follows:

$$\text{estimated magnitude} = |Q| + \frac{1}{2}|I|;\ |Q| > |I|$$

Returning to FIG. 13, the output of the magnitude approximation circuit 1304 is input to the adder 112. The adder 112 sums the results of the current magnitude approximation, with an accumulated result stored in magnitude RAM 113. In addition, during the summation, an offset is subtracted from the current magnitude approximation, where the offset is provided by a minimum value register 1306. As described above, magnitude results are computed for various delays comprising an entire C/A code epoch. For each C/A code epoch, the minimum value register 1306 is updated to reflect the lowest observed magnitude during the epoch (i.e., the smallest value from magnitude approximation circuit 1304). The minimum value is then stored and used as an offset during the magnitude accumulation process for the subsequent epoch. In this manner, the present invention avoids the buildup of a large bias that would otherwise be caused by the magnitude accumulation operation.

In another embodiment, a complex normalizer that does not approximate the complex magnitude is coupled to dividers 1302I and 1302Q in place of the magnitude approximation circuit 1304. In yet another embodiment, the outputs from signal RAMs 110a and 110b are coupled directly to the magnitude approximation circuit 1304, without going through dividers 1302I and 1302Q. In either embodiment, the present invention reduces the complexity of the magnitude accumulation circuit 1300 by either quantizing the outputs from signal RAMs 110*a* and 110*b*, or computing the complex magnitude values using an approximation.

As described above, FIG. 3 illustrates the accumulated magnitude waveform 302 in the absence of the minimum value offset circuit. Notably, the waveform 302 is offset from zero (illustrated by reference character 304), even for the regions where no signal correlation is present. This is because the expected value of the magnitude of a noise distribution is always positive. When many values from the distribution are summed, the expected value builds up resulting in an offset. The offset is undesirable in that it uses dynamic range in the magnitude RAM 113 that could otherwise be available for the signal correlation. For long integrations, involving many magnitude accumulations, the bias can become a large number and will require more bits in the magnitude RAM 113. The embodiment of the invention having the minimum value register 1306 greatly reduces the bias 304 of the correlation waveform. Consequently, nearly the full dynamic range of the magnitude RAM 113 is available for the accumulated magnitude waveform 1502. The benefit is that longer integrations can be performed without overflowing the RAM 113. In addition, a RAM 113 with fewer bits can be utilized.

Returning to FIG. 13, summer 1308 accumulates the total offset being subtracted from the adder 112. Specifically, each time a new minimum value is determined and stored in the minimum value register 1306, it is added into a total offset value stored in offset value circuit 1310. At the end of the magnitude accumulation, the total offset value represents the total offset that has been subtracted from the accumulated magnitude in adder 112. The total offset value can be added back into the accumulated magnitude to recreate the full magnitude accumulation. In this way, the dynamic range of the physical magnitude RAM 113 is more effectively utilized. Those skilled in the art will appreciate that the minimum value register 1306 and offset value register 1310 can also be used without the dividers 1302I and 1302Q and/or the magnitude approximation circuit 1304.

While foregoing is directed to the preferred embodiment of the present invention, other and further embodiments of the invention may be devised without departing from the basic scope thereof, and the scope thereof is determined by the claims that follow.

What is claimed is:

1. A receiver of global positioning system (GPS) signals comprising:
   a decimation circuit for producing a subsampled in-phase (I) signal and a subsampled quadrature (Q) signal from digital samples of received GPS signals;
   a quantizer for producing quantized I and Q samples from the subsampled I and Q signals;
   a convolution processor for producing I and Q correlations.

2. The receiver of claim 1 wherein the quantized I and Q samples are represented using two bits.

3. The receiver of claim 1 wherein the quantizer produces the quantized I and Q samples by assigning each sample of the subsampled I and Q signals to one of a plurality of bins in accordance with one or more magnitude thresholds.

4. The receiver of claim 3 wherein samples of the subsampled I and Q signals having a zero value are assigned to one of the plurality of bins in a substantially random manner.

5. The receiver of claim 3 wherein samples of the subsampled I and Q signals having a zero value are assigned to one of the plurality of bins according to a repeating pattern.

6. The receiver of claim 1 further comprising a second quantizer for quantizing the I and Q correlations.

7. A method of receiving global positioning system (GPS) signals comprising:
   decimating digital samples of received GPS signals to produce a subsampled in-phase (I) signal and a subsampled quadrature (Q) signal;
   quantizing the subsampled I and Q signals to produce quantized I and Q samples;
   multiplying a C/A reference code with the quantized I and Q samples to produce I and Q correlations.

8. The method of claim 7 wherein the step of quantizing the subsampled I and Q signals further comprises representing the I and Q samples with two bits.

9. The method of claim 7 wherein the quantized I and Q samples are produced by assigning each sample of the subsampled I and Q signals to one of a plurality of bins in accordance with one or more magnitude thresholds.

10. The method of claim 9 wherein samples of the subsampled I and Q signals having a zero value are assigned to one of the plurality of bins in a substantially random manner.

11. The method of claim 9 wherein samples of the subsampled I and Q signals having a zero value are assigned to one of the plurality of bins according to a repeating pattern.

12. The method of claim 7 further comprising quantizing the I and Q correlations.

13. A receiver of global positioning system (GPS) signals comprising:
   a decimation circuit for producing a subsampled in-phase (I) signal and a subsampled quadrature (Q) signal from received GPS signals;
   a convolution processor for producing I and Q correlations;
   a divider for reducing the number of bits of precision of the I and Q correlations to produce quantized I and Q correlations;
   a signal normalizer for normalizing the quantized I and Q correlations to produce complex magnitude values; and
   a magnitude accumulator for summing the complex magnitude values.

14. A receiver of global positioning system (GPS) signals comprising:
   a decimation circuit for producing a subsampled in-phase (I) signal and a subsampled quadrature (Q) signal from received GPS signals;
   a convolution processor for producing I end Q correlations;
   a magnitude approximation circuit for normalizing the I and Q correlations to produce complex magnitude values; and
   a magnitude accumulator for summing the complex magnitude values.

15. The receiver of claim 14 wherein the magnitude approximation circuit produces the complex magnitude values by individually computing the absolute value of the I and Q values and outputting $$|I| + \frac{1}{2}|Q|$$

when $|I| \geq |Q|$, and $$|Q| + \frac{1}{2}|I|$$

when $|Q| > |I|$.

16. A receiver of global positioning system (GPS) signals comprising:
- a decimation circuit for producing a subsampled in-phase (I) signal and a subsampled quadrature (Q) signal from received GPS signals;
- a convolution processor for producing I and Q correlations;
- a signal normalizer for normalizing the I and Q correlations to produce complex magnitude values;
- a magnitude accumulator for summing subsets of the complex magnitude values; and
- a minimum value register far storing a minimum magnitude value for each of the subsets of complex magnitude values to produce an offset, and for subtracting the offset from the complex magnitude values.

17. The receiver of claim 16 further comprising an offset value register for accumulating offsets stored in the minimum value register.

* * * * *

UNITED STATES PATENT AND TRADEMARK OFFICE
CERTIFICATE OF CORRECTION

PATENT NO. : 6,891,880 B2
DATED : May 10, 2005
INVENTOR(S) : Charles Abraham

Page 1 of 1

It is certified that error appears in the above-identified patent and that said Letters Patent is hereby corrected as shown below:

<u>Column 5,</u>
Line 35, after "similar" insert -- characteristic, since the timing of the decimation operation ensures that samples are --.

Signed and Sealed this

Seventeenth Day of January, 2006

JON W. DUDAS
*Director of the United States Patent and Trademark Office*